(12) United States Patent
O'Rourke

(10) Patent No.: US 10,738,428 B2
(45) Date of Patent: Aug. 11, 2020

(54) POOPER SCOOPER DEVICE AND DOG LEASH HOUSING WITH A HOLDER FOR A POOPER SCOOPER DEVICE

(71) Applicant: Hugh O'Rourke, Birr (IE)

(72) Inventor: Hugh O'Rourke, Birr (IE)

( * ) Notice: Subject to any disclaimer, the term of this patent is extended or adjusted under 35 U.S.C. 154(b) by 0 days.

(21) Appl. No.: 16/461,275

(22) PCT Filed: Nov. 16, 2017

(86) PCT No.: PCT/EP2017/079530
§ 371 (c)(1),
(2) Date: May 15, 2019

(87) PCT Pub. No.: WO2018/091626
PCT Pub. Date: May 24, 2018

(65) Prior Publication Data
US 2019/0271126 A1    Sep. 5, 2019

(30) Foreign Application Priority Data
Nov. 18, 2016    (GB) .................................. 1619542.2

(51) Int. Cl.
*E01H 1/12*    (2006.01)
(52) U.S. Cl.
CPC ..... *E01H 1/1206* (2013.01); *E01H 2001/128* (2013.01); *E01H 2001/1233* (2013.01); *E01H 2001/1273* (2013.01)
(58) Field of Classification Search
CPC .......... E01H 1/1206; E01H 2001/1233; E01H 2001/128; E01H 2001/1273
See application file for complete search history.

(56) References Cited

U.S. PATENT DOCUMENTS

| 4,466,648 | A | | 8/1984 | Albiez |
| 5,725,268 | A | | 3/1998 | Besasie et al. |
| 6,059,333 | A | * | 5/2000 | De Toma .............. E01H 1/1206 294/1.3 |
| 6,196,600 | B1 | | 3/2001 | Miller |
| 7,216,905 | B1 | | 5/2007 | Armes, Jr. |
| 7,506,615 | B1 | | 3/2009 | Sansone et al. |
| 7,976,083 | B2 | * | 7/2011 | Black .................... E01H 1/1206 294/1.3 |
| 8,292,338 | B1 | * | 10/2012 | Baghdasaryan ...... E01H 1/1206 294/1.3 |

(Continued)

FOREIGN PATENT DOCUMENTS

| CA | 2 463 303 A1 | 10/2005 |
| DE | 84 05 788 U1 | 11/1984 |

(Continued)

OTHER PUBLICATIONS

PCT/EP2017-079530, International Search Report and Written Opinion dated Jun. 11, 2018.

(Continued)

*Primary Examiner* — Stephen A Vu
(74) *Attorney, Agent, or Firm* — Meunier Carlin & Curfman LLC

(57) ABSTRACT

A re-usable pooper scooper device (1) and a dog leash (101) comprising said pooper scooper device (1) are disclosed. The pooper scooper device (1) is easily manufactured, compact and less cumbersome to carry than those of the prior art.

20 Claims, 24 Drawing Sheets

(56) References Cited

U.S. PATENT DOCUMENTS

| | | | |
|---|---|---|---|
| 8,550,512 B2 | 10/2013 | Jones, Jr. | |
| 8,556,309 B1 | 10/2013 | Charette | |
| 8,833,816 B2 * | 9/2014 | Hoffman | E01H 1/006 294/1.3 |
| 8,899,643 B2 * | 12/2014 | Sigmund | A01K 27/004 294/1.3 |
| 2009/0072558 A1 | 3/2009 | Hanson et al. | |
| 2009/0315349 A1 | 12/2009 | Black et al. | |
| 2014/0152031 A1 | 6/2014 | Ballacchino | |
| 2015/0240434 A1 * | 8/2015 | Kaufman | E01H 1/1206 294/1.3 |
| 2015/0282456 A1 * | 10/2015 | Harley | A01K 27/008 119/796 |

FOREIGN PATENT DOCUMENTS

| | | |
|---|---|---|
| DE | 10 2008 028593 A1 | 12/2009 |
| ES | 2 430 790 A1 | 11/2013 |
| GB | 2 032 831 A | 5/1980 |
| WO | 2008/014758 A1 | 2/2008 |
| WO | 2016/001220 A1 | 1/2016 |

OTHER PUBLICATIONS

PCT/EP2017-079530, International Preliminary Report on Patentability dated Oct. 16, 2018.

* cited by examiner

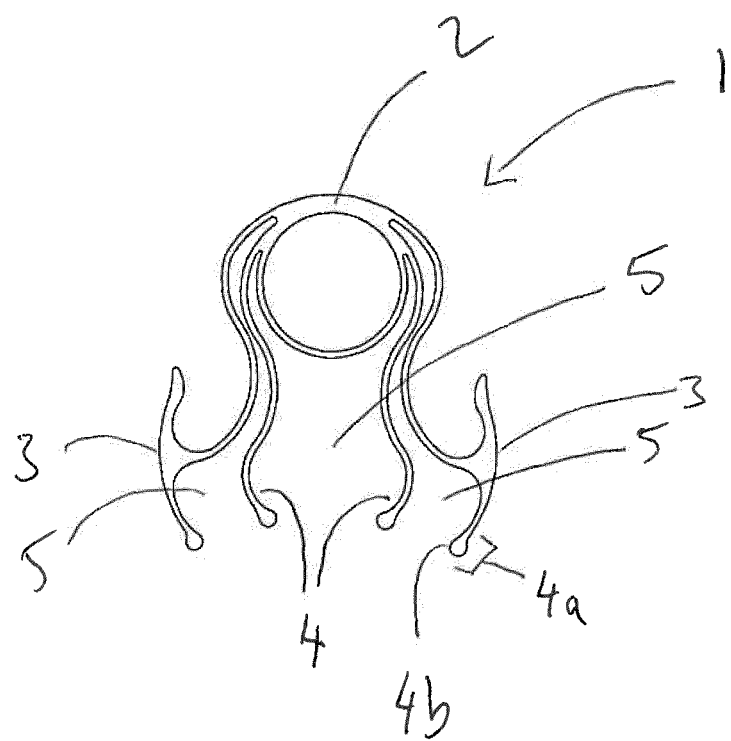

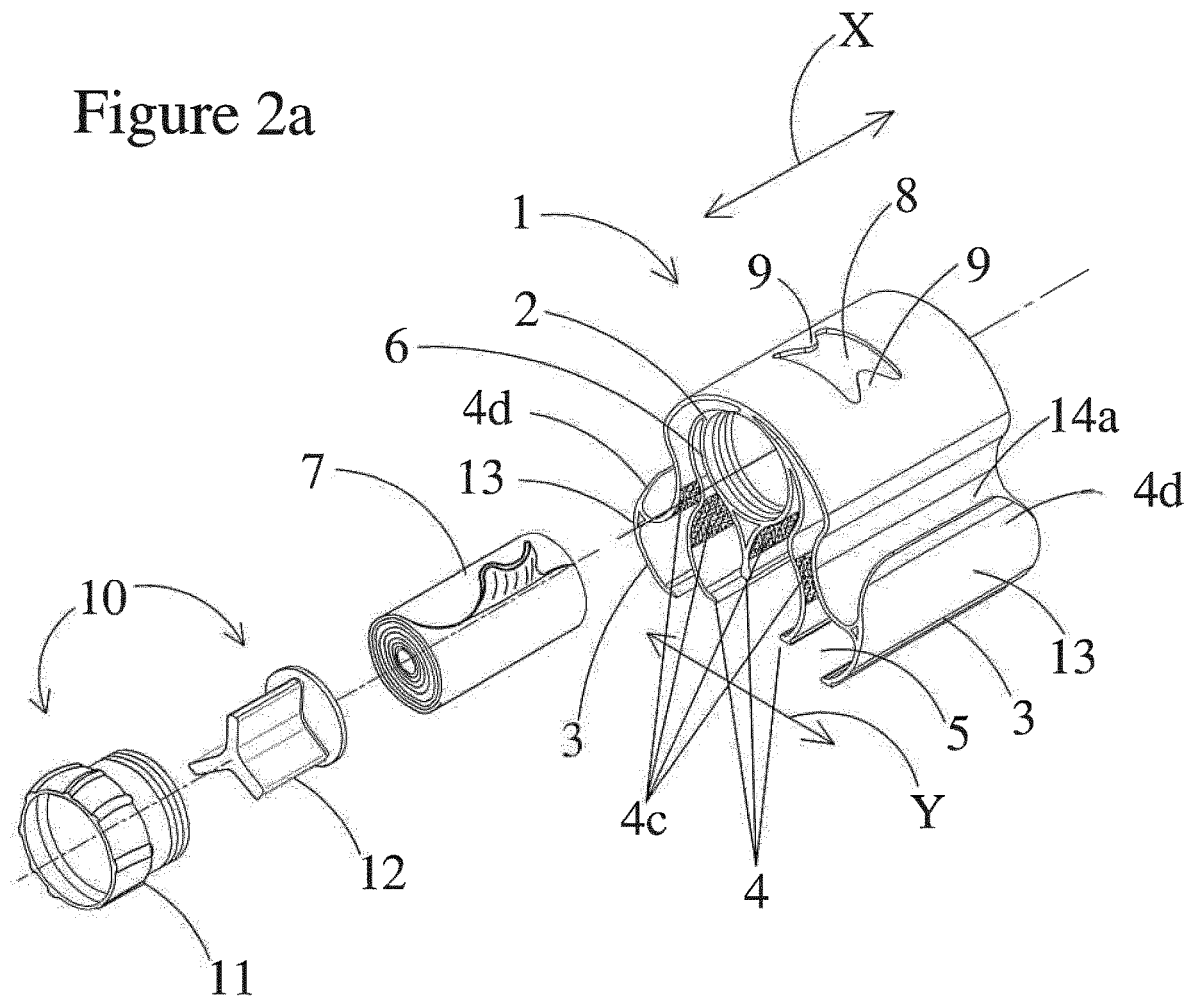

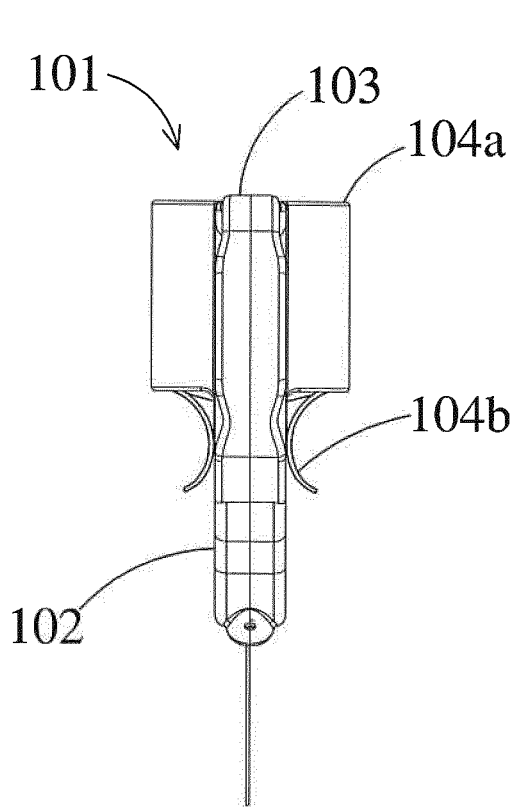
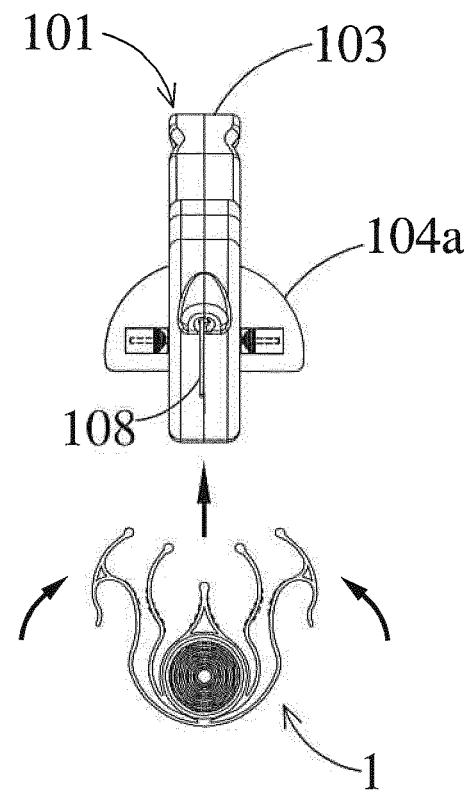
Figure 10
Figure 11
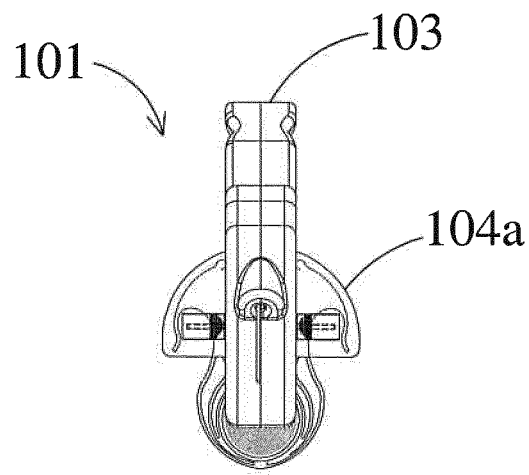
Figure 12

POOPER SCOOPER DEVICE AND DOG LEASH HOUSING WITH A HOLDER FOR A POOPER SCOOPER DEVICE

FIELD OF THE INVENTION

The present invention relates to an animal waste collection device, specifically a pooper scooper device, for bagging faeces in a collection bag.

BACKGROUND TO THE INVENTION

The presence of animal faeces in public areas, such as on footpaths, roads, neighbourhoods and public parks is unsightly and unsanitary. Many communities have enacted regulations or laws requiring pet owners to take responsibility for their pets, and in particular, to remove any faeces deposited by their pets and to dispose of it appropriately and in a sanitary manner. Failure to comply with such regulations or infringement of such laws can result in the pet owner being penalised, typically with a fine.

A number of devices have been invented and marketed to address this issue. In general, these devices are designed to collect, transport and dispose of the pet faeces in a near-by bin. These devices are commonly referred to as pooper scooper devices.

The most simple faeces collection takes the form of small plastic disposable bags, which a pet owner employs to pick up the faeces. The pet owner simply places their hand in one such bag, thereby employing said bag as a protective glove, before manually picking up the faeces, turning the bag inside out to hold the faeces within the bag, closing the bag and then disposing of same.

While this method advantageously, does not significantly burden the owner with an additional awkward, unsightly piece of equipment to carry, there is a significant psychological drawback with this methodology, as the owner indirectly feels the texture, and warmth of the faeces, which is unpleasant and embarrassing. Furthermore, an unobserved perforation in a collection bag, exposes the responsible pet owner directly to contamination by the faeces, which is unsanitary, and may cause infection such as bacterial infection or parasitic infection.

Pooper scooper devices of various shapes and sizes have been developed, to distance the device user from the faeces, while also enabling effective removal and disposal of said faeces. A drawback associated with many of these devices is that during use, they become soiled and thus must be disposed, carried after use and may have to be washed after each use.

Some devices comprise a long handle with a scoop at the end of said handle, with which the user scoops up the faeces or employs another object such as rake or other suitable device to push the faeces into the scoop.

U.S. Pat. No. 6,196,600 describes a pooper scooper comprising a scooping tray, pivotally attached to a handle, the tray comprises a waste exiting window through which the animal faeces can drop into a disposable bag, when the tray is tilted upwards. The front end of the tray comprises forks which enable the user to collect animal waste in deep grass or weeded areas.

U.S. Pat. No. 8,550,512 describes an alternative device which in use is employed to capture the pet faeces during the defecation process. The device comprises an elongated foldable pole, a releasable locking mechanism, and a pivotable waste collecting assembly adapted to hold a bag open to catch pet droppings during defecation. The collection assembly comprises a facility for automatically closing the bag into which the faeces has been deposited by the pet, by pulling a drawstring on the bag, thereby closing the bag. The closed bag containing the faeces, can then be disposed of appropriately by the operator.

A plethora of alternative pooper scooper devices have been designed and marketed, which comprise a long handle and scooping device configuration. A significant disadvantage of such devices, is the inconvenience and awkwardness to the user of having to carry said devices with an inability to do so discretely.

In order to address this drawback, several smaller devices have been developed.

US Patent Publication No. 2009315349 describes a pooper scooper device comprising a collection bag having a waste removal tool, attached to the closed bottom of said bag. The waste removal tool includes a pair of jaws which can be moved from an open position to a closed position. The user employs the device in a grabbing action to scoop up the faeces into the waste removal tool. The entire tool and bag are then disposed of. In a further embodiment, the device is placed inside the bag, such that the waste removal tool is not in direct contact with the faeces. The jaws of the device terminate in a blade portion, designed to urge the faeces into the bag. The users hand is no longer required for manual pick up and thus a used is protected from the unpleasant tactile experience, described above, which is associated with employing only a bag as a protective glove, when manually picking up animal faeces.

US Patent Publication No. 2009072558 similarly describes a disposable pooper scooper device. The device includes a plastic bag with handles attached to a cardboard shovel blade. The plastic bag is open at the end opposite the shovel blade. The open end of the bag is partially turned inside-out as it slips over the operator's hand and up the wrist and forearm. Once the animal waste is shovelled up, in a grabbing action between opposing blades, the bag is pulled completely inside out over the mouth of the shovel completely encapsulating the blade and faeces. The open end of the bag can then be tied off and the bag disposed of.

U.S. Pat. No. 5,725,268 similarly describes a pooper scooper comprising a tray attached to the closed end of a bag, which device comprises two opposing sidewalls which are employed to shovel up faecal deposits using a grabbing action. The bag is then peeled over the device and the entire device, comprising the faeces is disposed of.

US Patent Publication No. 2014152031 describes a pooper scooper device comprising a handle for storing a plurality of disposable bags, a stem extending from the handle and including a bore for receiving the bags and a plurality of pivotable fingers that are pivotally movable relative to the stem. A disposable bag is pulled through the bore of the stem and the open end of the bag is pulled beyond and folded over the fingers. The operator can actuate an actuating mechanism that operates to pivot the fingers between closed and open positions. The device scoops up the faeces into the bag using a grabbing action. The bag comprising the faeces is then tied off and disposed of by the operator. A disadvantage associated with the device of US2014152031 is the abundance of component parts, including many moving parts, the expense associated with manufacturing the device, and the size of the device is such that it is too large for the operator to carry discretely.

U.S. Pat. No. 7,216,905 describes a disposable pooper scooper device comprising a claw mechanism including a first set of arcuately formed finger members and a second opposing set of arcuately formed finger members that are displaced from each other in a longitudinal direction. A bag is attached to the claw mechanism. The operator whose hand is inserted into the bag, operates a pair of actuating members which provide actuation of the arcuately formed finger members between an open and closed position. The arcuately formed fingers are employed to scoop up the faeces in a grabbing action, the bag is peeled over the claw mechanism comprising the faeces, and the bag is tied off and disposed of by the operator.

Many of the aforementioned smaller devices, which essentially consist of a shovelling element having a grabbing action, and a disposable bag, are less effective, when the faeces is comparatively large, or less solid.

Accordingly, a need exists for improved pooper scooper devices that are easy to operate, which can be easily and cost effectively manufactured, and which address the aforementioned drawbacks associated with prior art devices.

SUMMARY OF THE INVENTION

In one aspect, the present invention provides a pooper scooper device comprising:
a base part,
two opposing leaves on the base part,
at least one intermediate leaf disposed between the opposing leaves,
wherein the two opposing leaves and the at least one intermediate leaf are formed in a spaced apart manner, and wherein the at least one intermediate leaf or leaves define channels between the opposing leaves, so that when the device is pressed down onto faeces the faeces is forced into and lodges in said channels.

The device is used for bagging faeces in a collection bag. In use, the two opposing leaves and the at least one intermediate leaf are inside a collection bag and the faeces is collected by pressing a part of the bag down onto the faeces using the leaves so that a part of the bag and the faeces are forced into and lodge in the channels between the opposing leaves and the at least one intermediate leaf.

Advantageously, when the device is covered by a collection bag, and subsequently pressed down onto faeces, the presence of the at least one intermediate leaf ensures that the bag is interposed between the leaves in the channels thereby maximising the contact surface area of the bag exposed to the faeces. By increasing the contact surface area of the bag and the faeces, the natural adhesive properties of the faeces are harnessed, which ensures successful collection of said faeces.

Suitably the base part and all leaves are integrally formed.

At least the two opposing leaves are moveable relative to each other to move apart in an opening direction and move towards each other in a closing direction.

Optionally the base part and the two opposing leaves are integrally formed so that a load bearing on one or both of the two opposing leaves effects relative movement of the two opposing leaves in the opening direction or the closing direction by relative flexing of the respective leaf and the base part.

Optionally the device may further comprising a pair of actuating members coupled to said opposing leaves for reversibly displacing said opposing leaves from a first position to a second position. The actuating members may comprise digit receptacles defined in each of the opposing leaves. The actuating members may take the form of a gripping channel, for example a substantially U-shaped channel, or substantially C-shaped channel, or substantially V-shaped channel. Suitably, the gripping channel comprises a base and sidewalls.

The device may comprise at least two, for example three, intermediate leaves disposed between the opposing leaves. Preferably, the device comprises 2 or 3 intermediate leaves between the opposing leaves. Advantageously, the presence of 2 or 3 intermediate leaves, ensures that when the device is covered by a bag and the bag is interposed between the leaves that the surface area of the bag which is maximised, thereby harnessing the adhesive properties of the faeces and ensuring effective collection of the faeces.

The opposing the opposing leaves and the base part may flex on a flexure bearing principle. For example, the base part may be a flexure bearing joining the two opposing leaves.

Suitably, the base comprises a housing for storing a plurality of disposable bags. Advantageously, this reduces the number of separate items that the dog walker needs to carry.

The base may comprise a substantially cylindrical housing, with a hollow space therein in which a plurality of disposable bags, for example, a roll of disposable bags, may be stored. The base may comprise a dispensing aid for dispensing or receiving bags from said housing. This in particular simplifies retraction of bags back into the housing if the operator unintentionally unrolls more than the required number of bags.

For example, the dispensing aid may comprise a rotatable dispenser for dispensing bags from a roll.

The base may be substantially cylindrical and the leaves may be circumferentially displaced about the base. Suitably, the leaves may be arcuately shaped. Advantageously, this enhances the gripping ability of the leaves. Optionally, gripping means may be provided on the leaves. For example, the leaves may comprise gripping means. Suitably, the gripping means may comprise a rubber strip on the, or the surface of the leaves may be roughened. The gripping means may comprise detents, or gripping teeth, or for example, a roughened surface, such as sandpaper. Suitably, the gripping means comprises one or more strips of sandpaper. The gripping means is suitably positioned within at least some of the channels formed by the intermediate leaves and the opposing leaves. Optionally the gripping means is positioned within each of the channels formed by the intermediate leaves and the opposing leaves. The gripping means is positioned within the channels in order to enhance the ability of the leaves to grip the bag interposed between the leaves.

Each of the leaves may comprise terminal regions and said terminal regions may have an enlarged rounded edge for example the edge of said terminal regions may have a cross-section which is substantially mushroom shaped or tear drop shaped. Advantageously, this reduces the likelihood of puncturing the bag during use.

The device may optionally further comprise a holder for receiving said device.

In another aspect, the present invention provides a method for bagging faeces comprising the steps of interposing a bag between the leaves of the pooper scooper device according to the invention, and employing said pooper scooper device to press said bag into said faeces, such that the faeces is forces into the channels of the device and thereby grips said faeces, whereby the device is protected from directly contacting the faeces by the bag, and enclosing the faeces in the bag.

In yet another aspect, the present invention provides a dog leash assembly comprising a leash, a handle for the leash and a pooper scooper device as described above. Advantageously, this further reduces the number of separate items a dog walker needs to carry.

The dog leash assembly may be a retractable dog leash.

Suitably, the handle of the leash comprises a holder for receiving the pooper scooper device of the invention. The dog leash assembly may further comprise attachment means for attachment of a bag comprising faeces, to the leash. This removes the necessity for the dog walker to hold the bag comprising the faeces directly in their hand when transporting the bag to a suitable disposal site. Optionally, the dog leash assembly may comprise a receptacle for storing collection bags.

In yet a further aspect, the present invention provides a dog leash housing comprising a body, a handle, and engaging means for securing a dog leash to said housing, said body comprising a holder for a pooper scooper device, said holder comprising a chamber and retaining means for retaining a pooper scooper device at least partially within the chamber such that faeces engaging elements of the pooper scooper device are housed within the chamber and a handle of the pooper scooper device remains at least partially outside the chamber. For example the handle of the pooper scooper device may remain entirely outside the chamber when said pooper scooper device is housed within the chamber.

The chamber has a length and a width, and suitably, the length of the chamber is greater than the width of said chamber, and a longitudinal axis of the chamber is substantially parallel to a longitudinal axis of the dog leash housing.

The dog leash housing may further comprise a cover member for protecting the engaging means. The cover member may be configured to prevent unwanted release of a secured dog leash.

The dog leash housing may further comprise attachment means for attachment of a bag holding faeces to the housing.

The dog leash housing may further comprise a receptacle suitable for storing one or more collection bags, for example suitable for storing a roll of collection bags.

The dog leash housing may further comprise a pooper scooper device retained in the chamber of the dog leash housing.

The dog leash housing may further comprise a torch.

In another aspect, the present invention provides, a dog leash assembly comprising a dog leash housing as described herein and a dog leash secured thereto.

The dog leash may be a rope lead.

Alternatively, the dog leash assembly may comprise a retractable dog leash.

The dog leash assembly may further comprise a pooper scooper device retained in the chamber of the dog leash housing. Suitably, the pooper scooper device is a pooper scooper device as described herein, wherein the terminal region of the leaves of the pooper scooper device are the faeces engaging elements.

BRIEF DESCRIPTION OF THE DRAWINGS

Embodiments of the invention will be described, by way of example only, with reference to the accompanying drawings in which:

FIG. 1b is a cross-section view of a further embodiment of the pooper scooper device.

FIG. 2a is a perspective view of the pooper scooper device of FIG. 1a.

FIG. 3 shows a plan view of the device of FIG. 1a.

FIG. 4 shows a side view of the device of FIG. 1a.

FIG. 10 shows a plan view of the dog leash assembly of FIG. 9.

FIG. 11 shows an end view of the dog leash assembly, and how the pooper scooper device is inserted into the holder.

FIG. 12 shows an end view of the dog leash assembly, comprising the pooper scooper device retained within the holder.

DETAILED DESCRIPTION

Figure 1A:
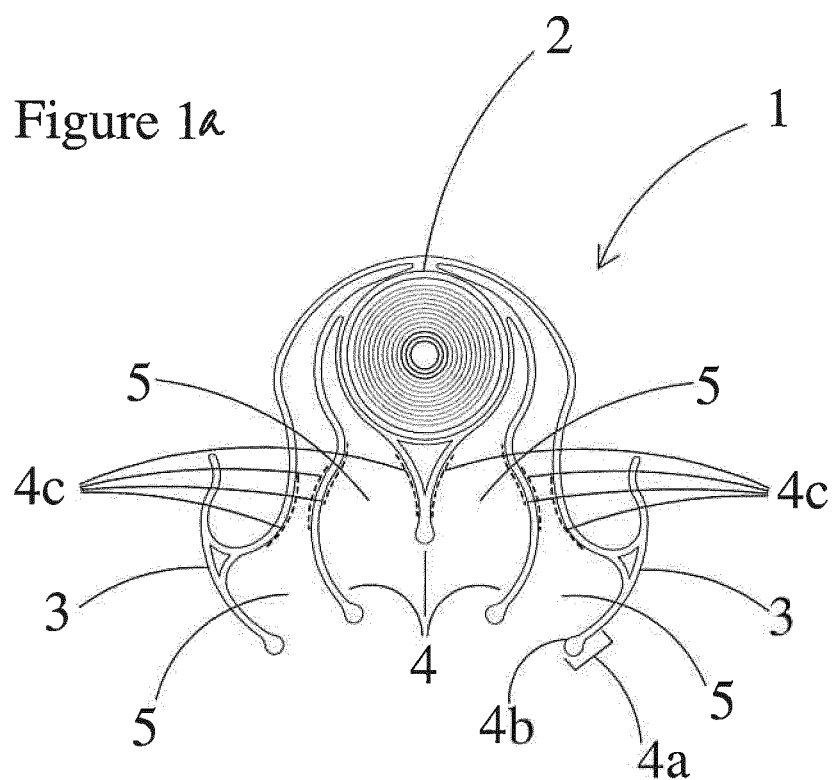
FIG. 1a is cross-section view of the pooper scooper device.

Throughout the figures, the same reference numerals and characters, unless otherwise stated, are used to denote like features, elements, components or portions of the illustrated embodiments. FIG. 1a shows a cross section view through the pooper scooper device. The device comprises a base part (2), two opposing leaves (3) on the base part (2), and three intermediate leaves (4). The intermediate leaves (4) are laterally spaced between the opposing leaves (3). The intermediate leaves (4) define channels (5) between opposing leaves (3). The channels (5) are elongate and three-dimensional in character. The channels cannot be considered as substantially two-dimensional slots or notches. Each leaf has a terminal region (4a) comprising an edge (4b), said edge having a substantially tear drop shaped cross-section. Advantageously, by rounding the edge (4b) to a tear drop or mushroom cross-sectional shape, the likelihood of perforation of a bag is significantly reduced. The device shown has three intermediate leaves. Advantageously, a device according to the invention comprising two or three intermediate leaves has demonstrated superior performance to devices comprising one or four intermediate leaves. Removal of the faeces from the ground is most effective when two or three intermediate leaves are present in the device. A device comprising four intermediate leaves was less effective, as the channel width defined by the leaves proved narrow and the collection bag was less inclined to conform to the shape of the leaves and interpose between said leaves in the channels. The device shown in FIG. 1a comprises gripping means (4c) for enhancing the grip the device has on a bag when interposed between the leaves. The skilled person will understand that many alternative types of gripping means would be suitable. The gripping means shown in FIG. 1a are formed by strips of sandpaper. Optionally, strips of rubber, a roughened surface on the leaves within the channels, detents, or gripping teeth may be used. The skilled person will appreciate, that the gripping means enhances the grip the leaves have on the bag interposed between the leaves in the channels defined by the intermediate leaves and the opposing leaves. The gripping means are configured not to perforate the bag.

FIG. 1b shows a cross section view through an alternative embodiment of the pooper scooper device. The device of FIG. 1b comprises two intermediate leaves (4). The presence of two intermediate leaves advantageously increases the size of the channels as compared to the device having three or more intermediate leaves, this configuration is particularly suitable for collecting larger faecal deposits.

Suitably, the device may be formed from a resiliently deformable material. For example, the device may be formed from a plastic material, such as a flexible polymeric material. The device may for example be manufactured using a three-dimensional printer. Suitably, the device may be moulded or machined.

At least some of the intermediate leaves (4) and the opposing leaves (3) are substantially parallel to one another.

Optionally the device may be formed from a polycarbonate material.

FIG. 2a shows a perspective view of the pooper scooper device. The device has a longitudinal axis depicted as X, and a transverse axis Y. The leaves (3, 4) run parallel to the longitudinal axis X and are laterally spaced across transverse axis Y. The elongate three dimensional character of the channels (5) is clearly depicted. The base part (2) and each of the intermediate leaves (4) are integrally formed. This reduces the complexity of the device, thereby reducing manufacturing costs and simplifying the manufacturing process. The base part (2) acts as a flexure bearing joining the opposing leaves (3). The base part (2) similarly acts as a flexure bearing joining two of the intermediate leaves (4). The base part (2) is substantially cylindrical and the leaves (3, 4) are circumferentially displaces about the base part (2). The opposing leaves (3) and at least some of the intermediate leaves (4) are arcuately shaped. The base part comprises a housing (6) for storing a plurality of disposable bags, such as a roll of disposable collection bags (7). The housing (6) comprises an opening (8) defined therein, wherefrom an operator can remove a bag, when required. The opening (8) comprises protruding flanges (9), against which a single bag can be separated from a roll of bags, by snagging a tear line in a roll of bags against one of said flanges (9). The device comprises a dispensing aid (10) for dispensing and receiving bags from the housing (6). In the embodiment shown, the dispensing aid comprises a collar (11) and a rotatable removable gripper (12). The collar (11) holds the gripper (12) in place in the device. In the embodiment shown, the collar (11) comprises a threaded screw which is received in a corresponding threaded bore in the housing (6). The skilled person will appreciate that other configurations of dispensing aid are equally suitable. The rotatable removable gripper may be provided with gripping edges, such as detents or teeth (not shown) which grip the roll of bags (7), additionally or alternatively, it may comprise a stem onto which a roll of bags may be mounted. The gripper (12) enables an operator to rotate the bag roll within the housing (6). When the operator wishes to remove a bag they can rotate the rotatable gripper (12) to unroll a bag from a roll of bags stored in the housing. If the operator accidentally, unrolls too many bags, they can rotate the rotatable gripper thereby rewinding the roll of bags within the housing and retracting a withdrawn bag attached to the roll back into the housing. In order to replace a roll of bags in the device, one removes the collar (11) and the rotatable removable gripper (12), and inserts a roll of bags (7) in the housing, ensuring to guide the first bag on the roll through opening (8).

Figure 2B:
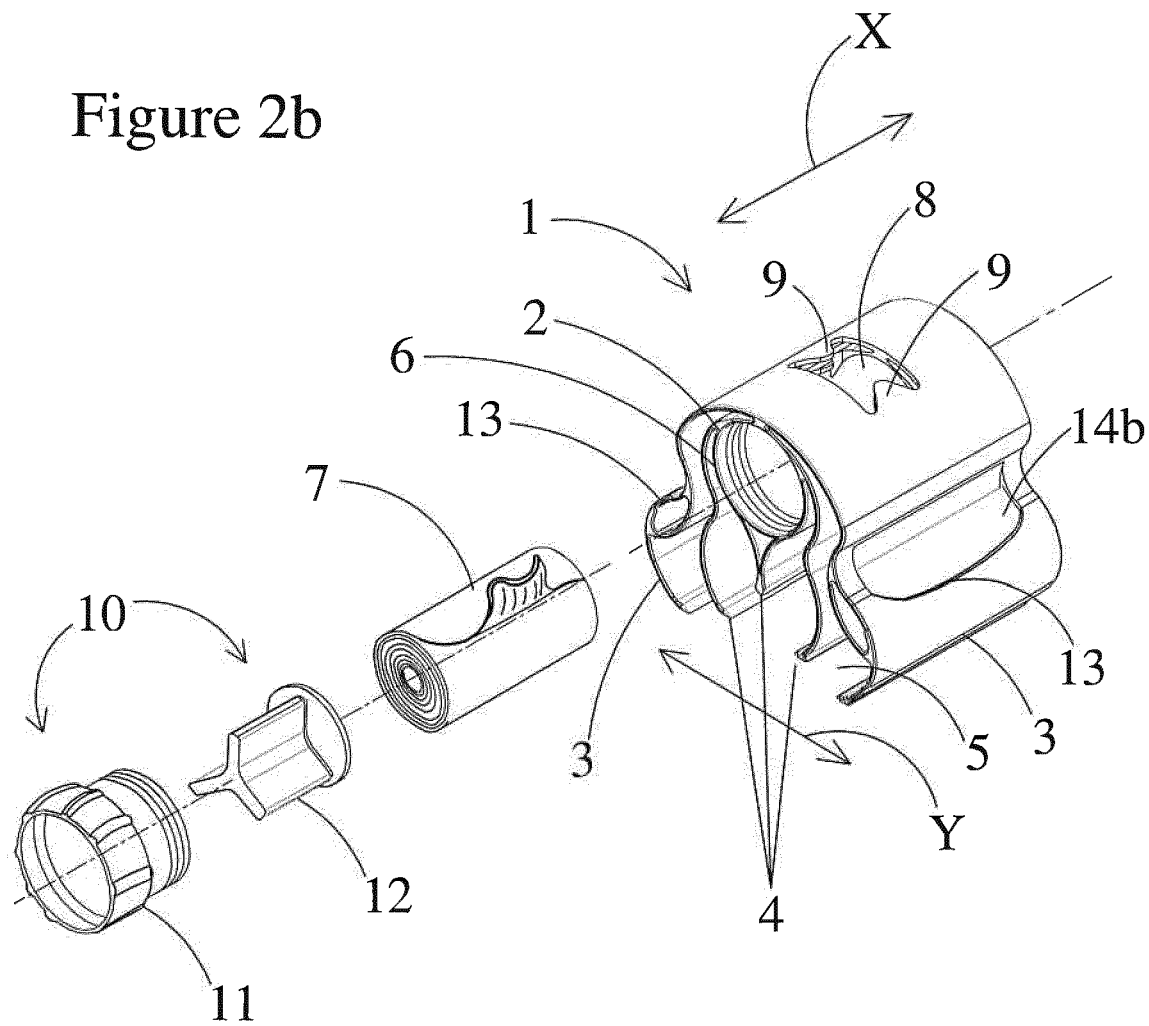
FIG. 2b is a perspective view of an alternative embodiment of the pooper scooper device.

The device of FIG. 2a comprises a pair of actuating members (13) each member comprising a gripping channel comprising a substantially U-shaped channel (14a) for receiving an operator's digits. Each substantially U-shaped channel comprises a base and sidewalls and as shown in FIG. 2a and said substantially U-shaped channel is defined by an opposing leaf (3) and a baffle (4d). This enables an operator holding the device to actuate the opposing leaves (3) from a resting position to an open position by employing their digits which are received in each of the substantially U-shaped channels (14a) to impose a biasing force against each baffle (4d) causing the leaves of the device to diverge and thereby to increase the volume of the channels (5) defined by the intermediate leaves (4) and the opposing leaves (3). Similarly, an operator can actuate the opposing leaves (3) from a resting position to a closed position by employing their digits which are received in each of the U-shaped channels (14a) to impose a biasing force against the opposing leaves (3) causing the leaves of the device to converge and thereby to decrease the volume of the channels (5) defined by the intermediate leaves (4) and the opposing leaves (3). (This actuation is discussed in more detail below). The skilled person will appreciate that alternative configurations of actuating members would be equally suitable, for example, as shown in FIG. 2b, the actuating members (13) may comprise digit receptacles (14b) defined in the leaves (3). In this embodiment, the operator's digits are received in the digit receptacles (14b). In such an embodiment, the operator may employ their digits which are received in said digit receptacles (14b) to similarly actuate the opposing leaves (3) from a resting position to an open position or from a resting position to a closed position. As the opposing leaves are suitably resiliently deformable, once a biasing force applied by the user is removed, the opposing leaves will revert to the resting position. The skilled person will understand that other actuating mechanisms would be also be suitable, for example, a substantially C-shaped channel or substantially V-shaped channel are suitable.

Figure 2C:
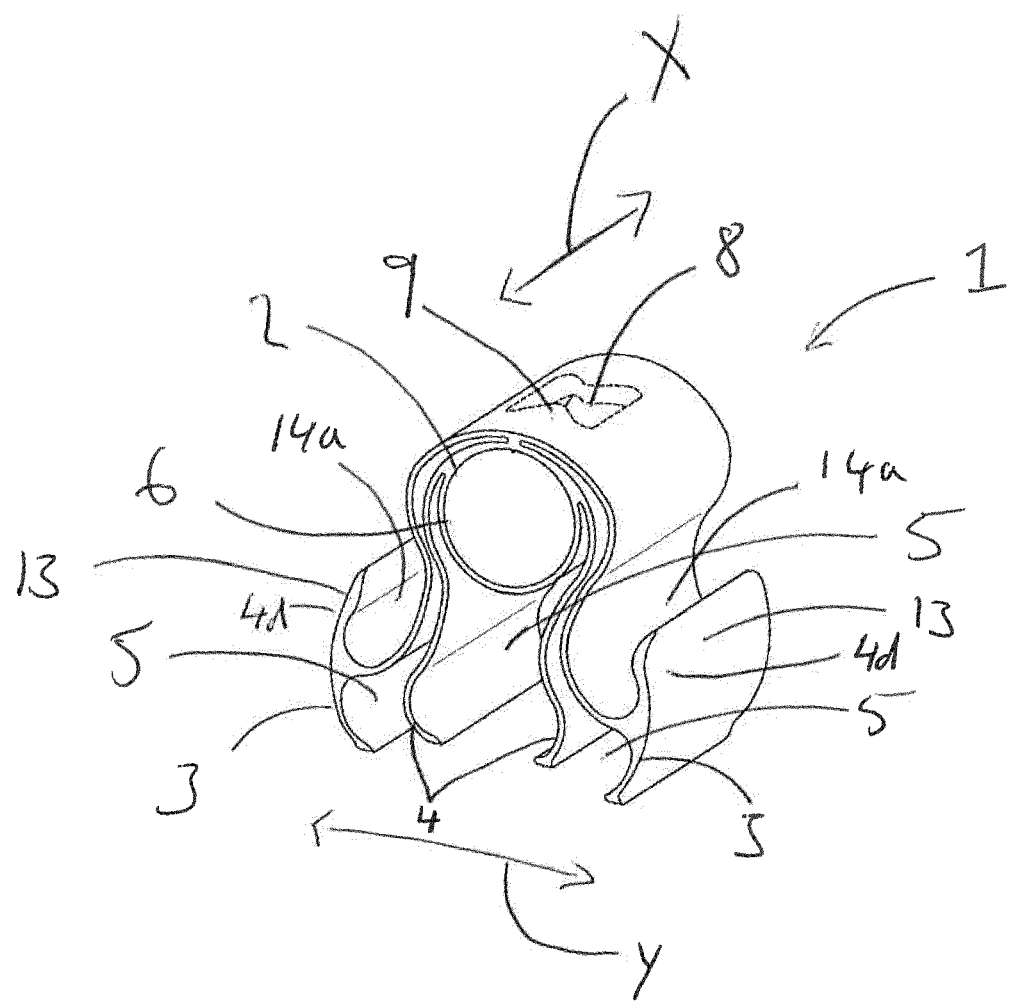
FIG. 2c is a perspective view of the pooper scooper device of FIG. 1b.

FIG. 2c shows a perspective view of the embodiment of the pooper scooper device of FIG. 1b. In the embodiment shown in FIG. 2c, there are two intermediate leaves (4). The intermediate leaves (4) define channels (5) between opposing leaves (3). There are three channels (5) in this embodiment. As was the case in the embodiments of FIG. 2a and FIG. 2b, the device of FIG. 2c also comprises a dispensing aid (not shown) for dispensing and receiving bags from the housing (6).

Figure 2D:
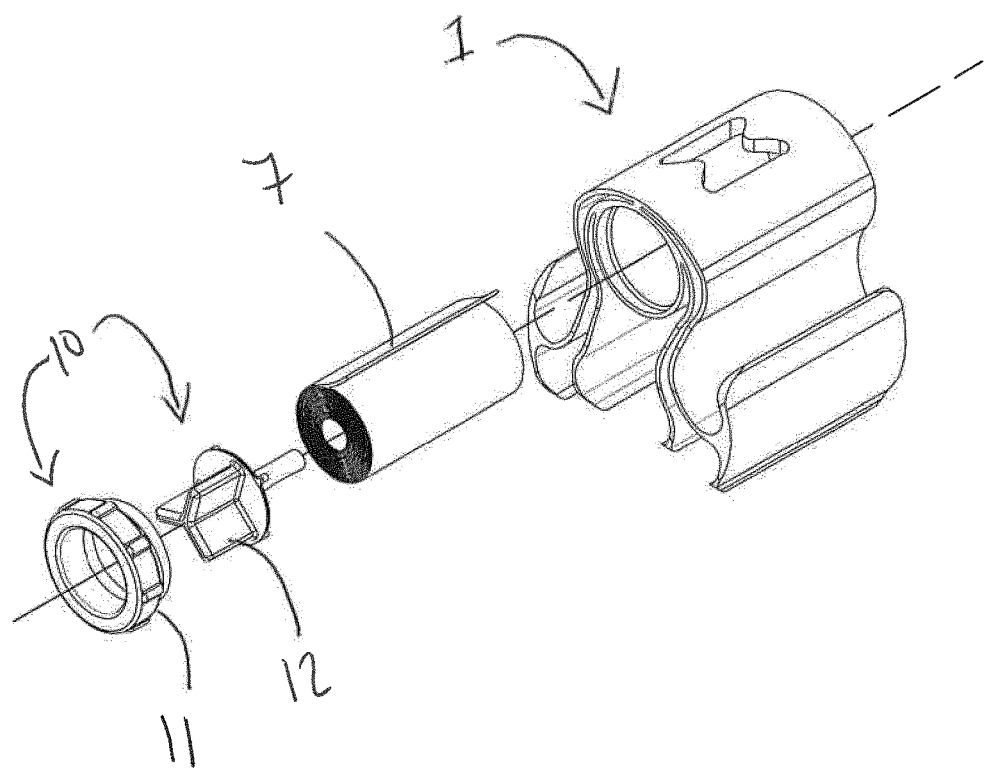
FIG. 2d and FIG. 2e are exploded views of the pooper scooper device of FIG. 2c.
Figure 2E:
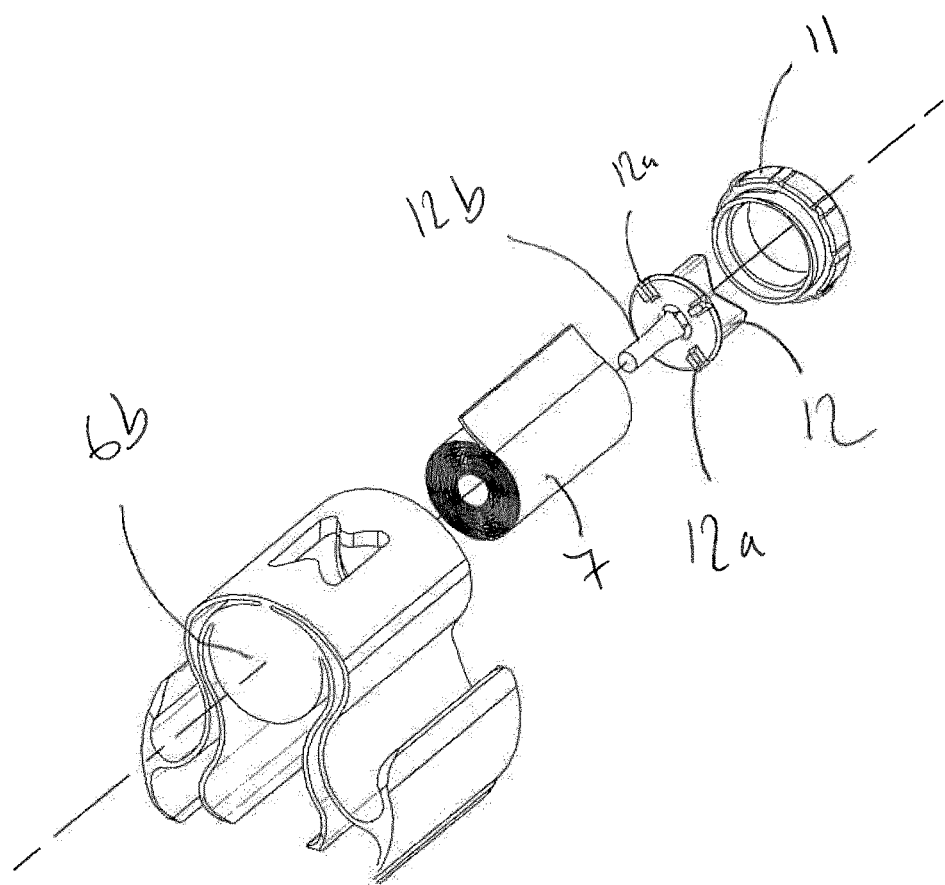

FIG. 2d shows the dispensing aid (10) of pooper scooper device of FIG. 2c. In the embodiment shown the dispensing aid comprises a collar (11) and a rotatable removable gripper (12). The collar (11) holds the gripper (12) in place in the device. FIG. 2e shows a rear view perspective of FIG. 2d. The rotatable removable gripper has gripping edges (12a), such as detents or teeth which grip the roll of bags (7). The rotatable removable gripper also comprises a stem (12b) onto which a roll of bags may be mounted. The gripper (12) enables an operator to rotate the bag roll within the housing (6). The housing comprises an end wall (6b) which closes off the end of the housing (6) distal to the end where dispensing aid is located.

Figure 3:
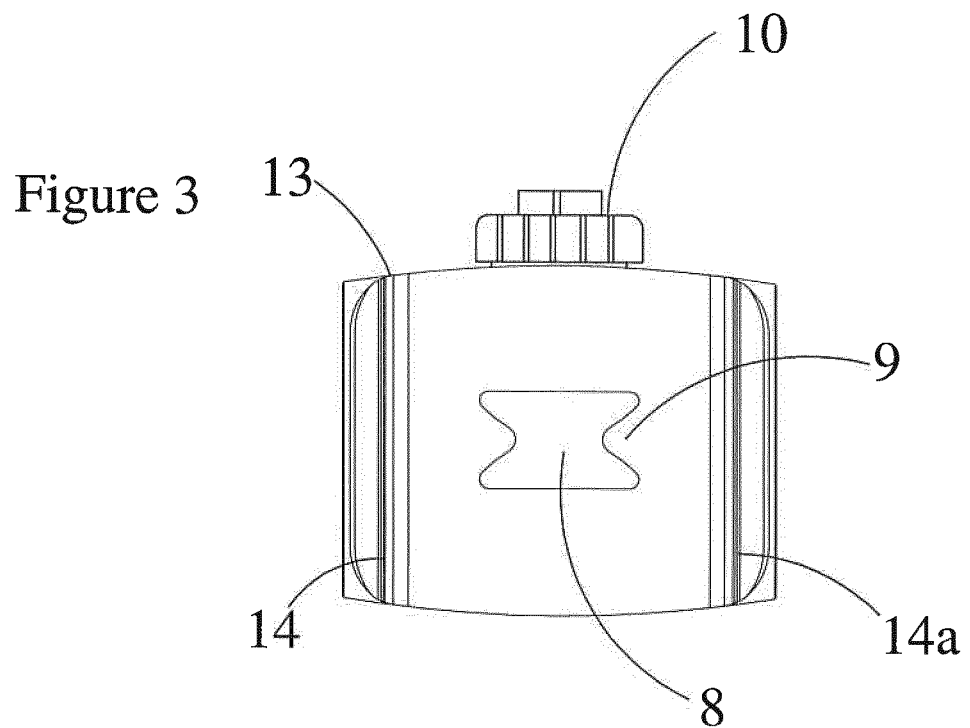
Figure 4:
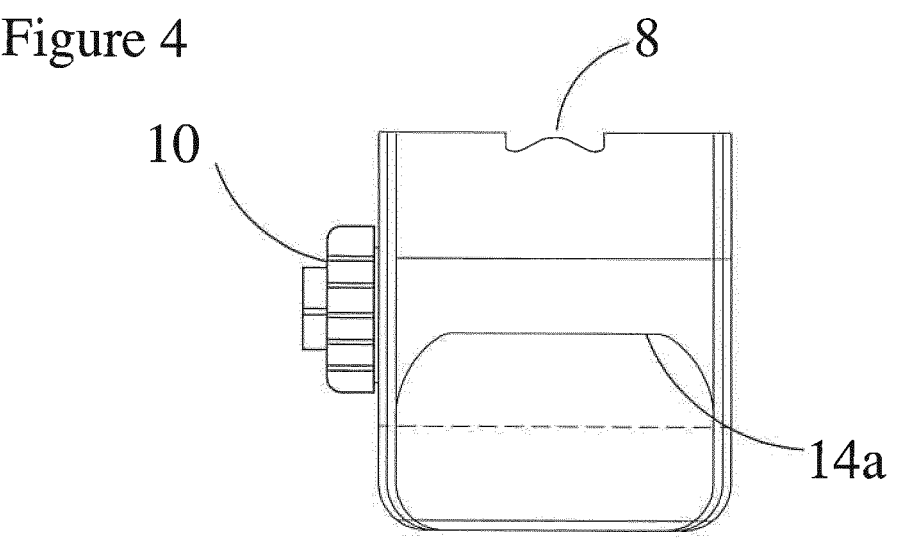

FIG. 3 shows a plan view of the device of FIG. 1a and FIG. 2a. FIG. 4 shows a side view of the device of FIG. 1a and FIG. 2a.

Figure 5A:
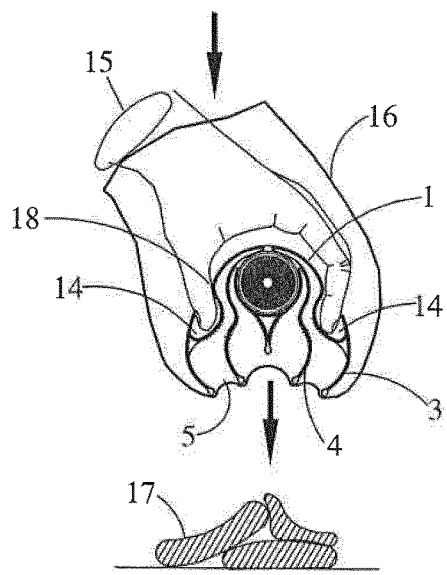
FIG. 5a-5f show the device of FIG. 1a in operation.
Figure 5B:
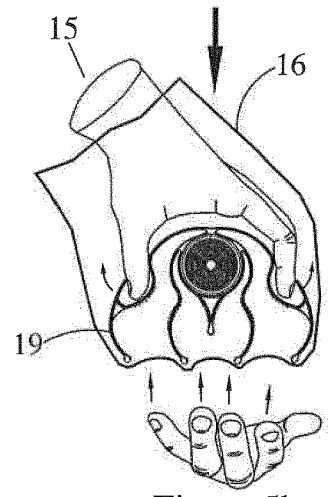
Figure 5C:
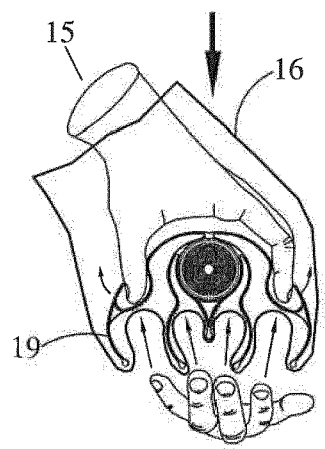
Figure 5D:
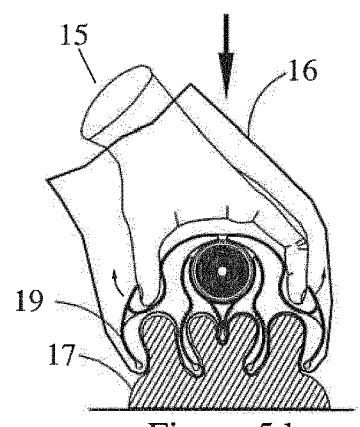
Figure 5E:
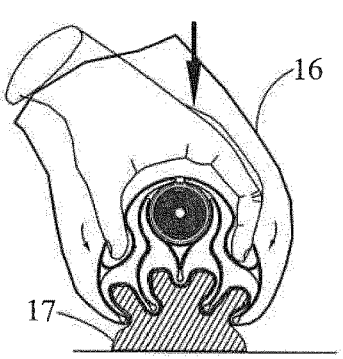
Figure 5F:
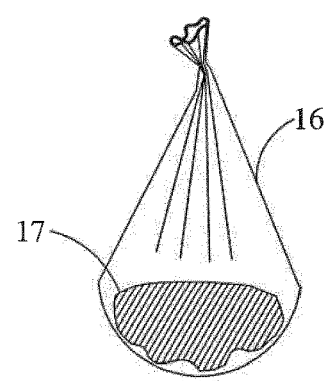

FIGS. 5a-5e show the device in operation. FIG. 5a shows the pooper scooper device (1), held in an operator's hand (15). The device (1) is shown inside a bag (16). The operator's thumb and fingers (i.e. the operator's digits) are shown in the substantially U-shaped channel digit receptacles (14) defined in the actuating members (13). The faeces (17) to be collected is shown below the device (1) being held by the operator. FIG. 5b shows how the operator has actuated the device (1) in an opening direction, from a resting first position (18) to an open second position (19). The device is constructed from a material of suitable flexural strength to facilitate such actuation. This is accomplished by the operator forcing the opposing leaves (3) apart. The pooper scooper device shown is integrally formed, and may for example be constructed by 3-dimensional printing of the device from a suitable substrate, such as from a plastic material. Suitably, the device is moulded, and may for example be formed from a thermoplastic or thermoset material. Suitably, the device may be manufactured by plastic injection moulding. As the device is integrally formed, forcing the opposing leaves (3) apart, also results in deformation of the intermediate leaves (4) causing them to move apart relative to one another. This actuation increases the volume in the channels (5), by increasing the distance between the leaves (3, 4), thereby enabling the collection of a comparatively larger faecal deposit. FIG. 5b and FIG. 5c shows how the bag is interposed between the leaves (3, 4) in the channels (5) by the operator. FIG. 5d shows the operator pressing the device (1) in an open second position (19) onto and into faeces (17), thereby contacting the bag (16) which is covering the device (1), with the faeces (17), and forcing the faeces (17) and the area of the bag (16) which is in contact with the faeces (17) up into the channels (5) between the leaves (3, 4). As the bagged device is pushed down onto and into the faeces, the faeces is divided by the leaves and enters the channels (5). FIG. 5e shows the operator removing the actuating force and the return of the leaves to a resting first position (18). The faeces (17) is thereby held in the channels (5). If necessary, the operator can squeeze the leaves from the resting first position (18) to a closed position which tightens the grip on the faeces (17). As is clearly shown in in FIG. 5e squeezing the leaves results in compression of the faeces held within the bag, and increases the operator's grip on the bag comprising the faeces. The operator then lifts the device (1) holding the faeces (17), and slips the bag (16) over the faeces (17) (not shown). The bag containing the faeces is then tied off as shown in FIG. 5f and can be disposed of appropriately by the operator.

If the faeces to be collected comprises a number of deposits, as occurs regularly, once the operator has mashed the bagged device into the first deposit, the operator can lift the device, while retaining the first faecal deposit, and subsequently repeat the process with the second deposit. If necessary, depending on the size of the deposits, the actuating members can be employed to increase the volume of the channels. Similarly, to increase the grip on the faeces, the actuating members may be employed to squeeze the opposing members together, thereby compressing the faeces in contact with the bag, and facilitating effective removal of the faeces.

When collecting larger faecal deposits, once the pooper scooper device is placed in the bag, the actuating members can be expanded to increase the volume in the channels, and the operator may prior to collection of the faeces, push the base of the bag which is in contact with the leaves, between said leaves into the channels, thereby further encouraging the faeces to be mashed up into the bag in the channels interposed between the leaves.

Advantageously, the presence of the intermediate leaves, increase the contact surface area of the bag with the faeces. This increase in surface area, harnesses the natural adhesive properties of the faeces, thereby enabling the operator to successfully collect and bag the faeces. The ability to actuate the resiliently deformable opposing leaves from a resting first position to an open second position, advantageously increases the volume of the channels and the contact area of the bag with the faeces. Furthermore, if required, the resiliently deformable leaves can be squeezed together to a closed position (not shown) thereby increasing the grip on the faeces in the channels and facilitating pick up thereof. Advantageously, the pooper scooper device can be used to effectively pick up faeces from a variety of surfaces such as from pavements, gravelled surface or grassy areas, such as in public parks, or sandy areas, such as on beaches. Suitably, the leaves may be provided with gripping means, to increase the grip between the leaves and the bag interposed between the leaves.

Figure 6:
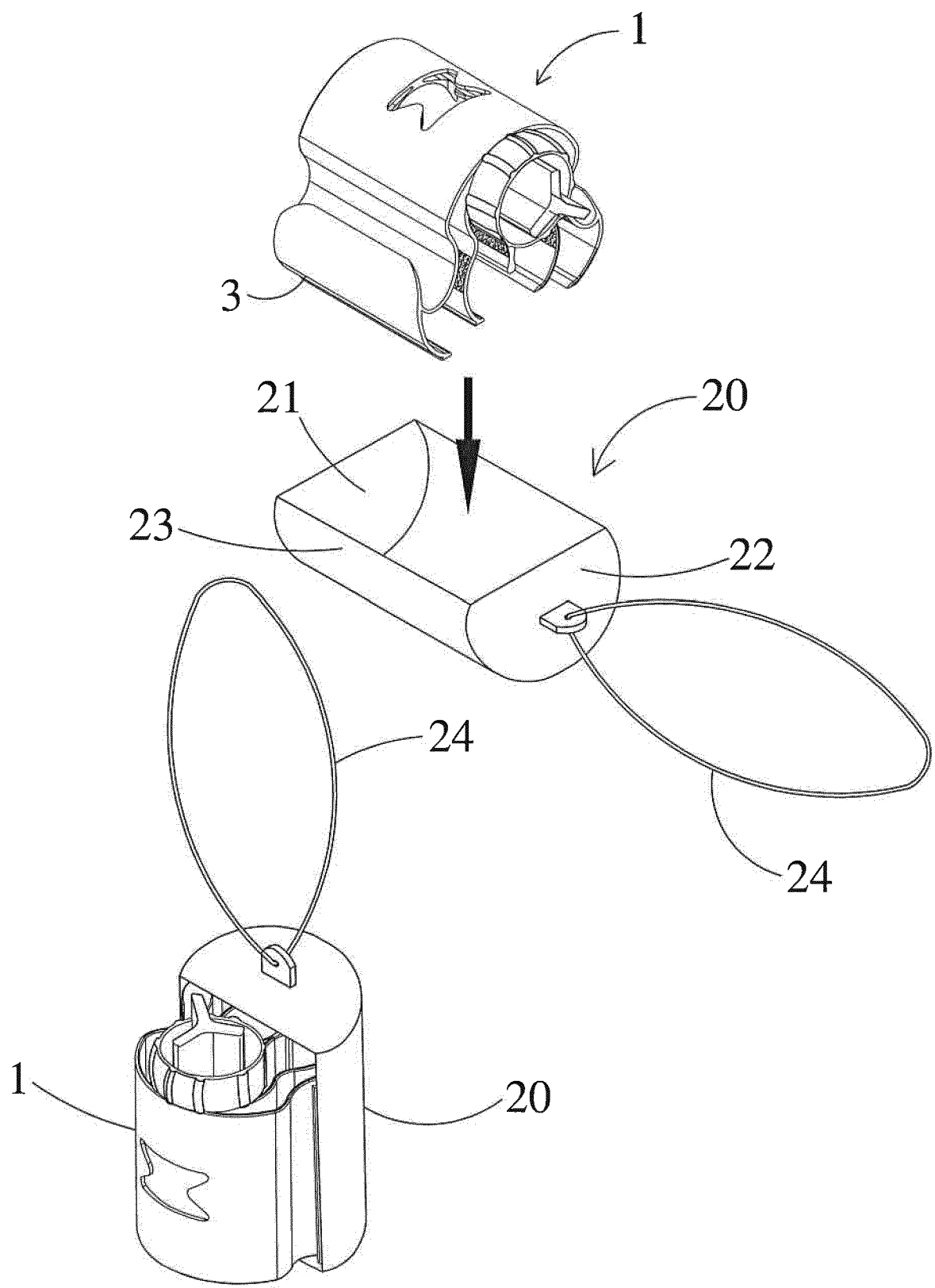
FIG. 6 shows the pooper scooper device of FIG. 1a and a holder therefor.

FIG. 6 shows the pooper scooper device (1) and a holder (20) therefor. The holder comprises a first end (21), a second end (22), and sidewalls (23) joining said first and second ends. The holder also comprises a handle or strap (24) for carrying the holder. In the embodiment shown in FIG. 6, the holder is partially cylindrical, however, the skilled person will appreciate that alternative configurations would be equally suitable.

The pooper scooper device (1) fits snugly into the holder (20). When inserted into the holder, the opposing leaves (3) are biased against the sidewalls (23) of the holder, thereby retaining the device in the holder. The handle of the holder provides a convenient method for holding the device, for example, when walking the dog, and is such that it could be held in the same hand as that carrying the dog's leash. Suitably, the holder may further comprise a receptacle for storing additional collection bags (not shown).

Figure 7:
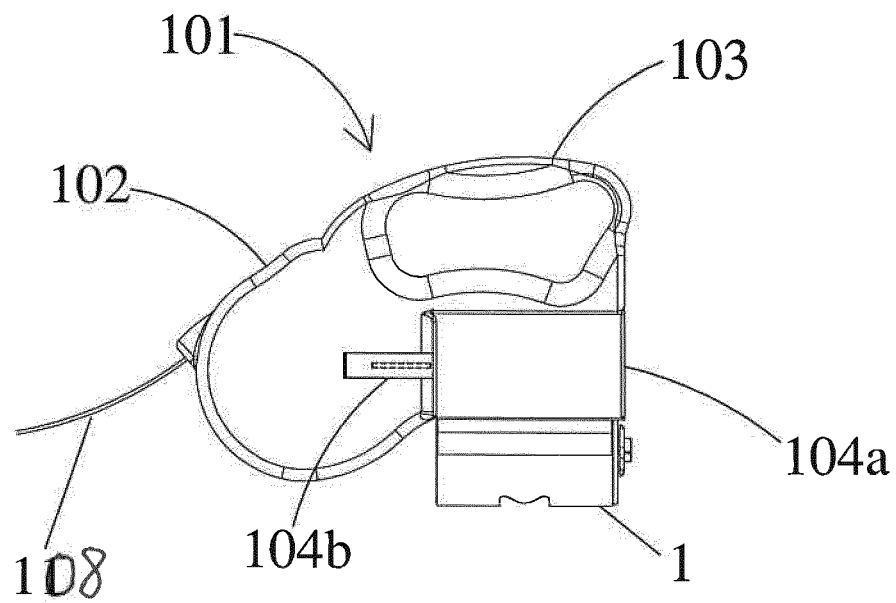
FIG. 7 shows a side view of the dog leash assembly comprising the pooper scooper device according to the invention.
Figure 8:
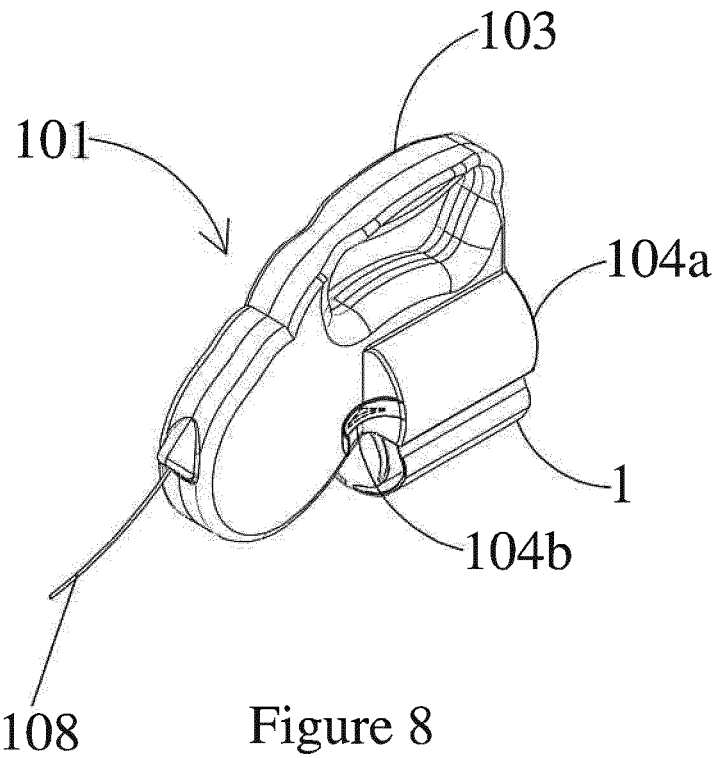
FIG. 8 shows a perspective view of the dog leash assembly comprising the pooper scooper device according to the invention.

FIG. 7 is a side view of a dog leash assembly (101) comprising the pooper scooper device (1) according to the invention. The dog leash assembly comprises a retractable dog leash (102). The dog leash assembly comprises a handle (103) having a holder (104a) for the pooper scooper device according to the invention. The handle further comprises a bag holder (104b) for holding used bags comprising faeces, thereby enabling the operator to transport the used bag without holding same directly in their hand. FIG. 8 is a perspective view of the dog leash assembly (101), showing the pooper scooper device (1), retained within the holder (104a) of the dog leash assembly (101).

Figure 9:
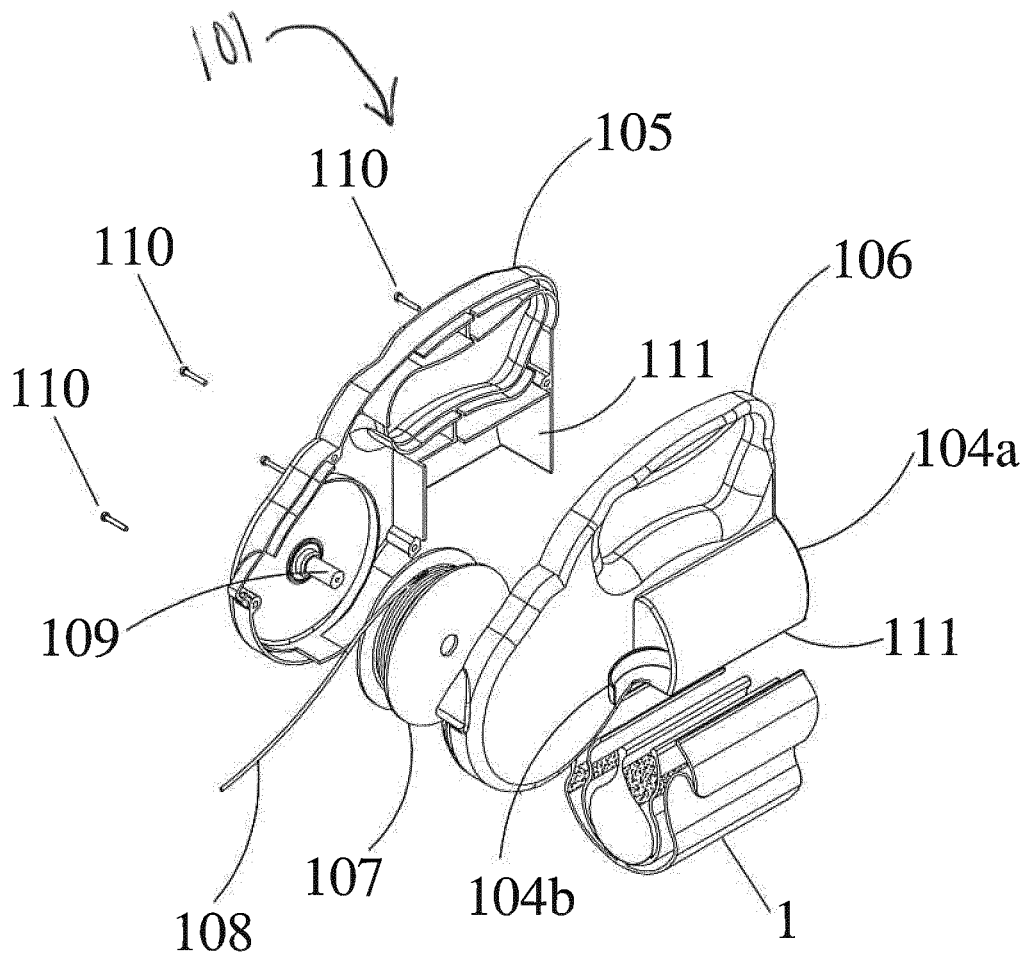
FIG. 9 shows a disassembled perspective view of a dog leash assembly.

FIG. 9 shows the dog leash assembly in a disassembled state. The dog leash assembly (101) comprises a first part (105), a second part (106) and a spool (107) with a leash (108) wound thereon. The spool (107) comprises a retraction mechanism (not shown) such as an internal spring which can be tensioned on the spool holder (109). The first part (105) and second part (106) can be assembled together with the spool (107) housed therein on the spool holder (109) and said first and second parts can be fixed together using fixing means, for example screws (110). In the embodiment shown, each of the first part (105) and second part (106) comprise a chamber (111). When the first and second parts are assembled to form the dog leash assembly, the chamber (111) of the first part and that of the second part form a holder (104a) in which the pooper scooper device can be retained.

FIG. 10 shows a plan view of the dog leash assembly of FIG. 9.

FIG. 11 shows the method for inserting the pooper scooper device according to the invention into the holder (104a) of the dog leash assembly (101). The operator squeezes opposing leaves of the pooper scooper device together and inserts the device into the holder. When the opposing leaves are released, i.e. when the biasing force imposed by the user by squeezing said opposing leaves, is removed, the resiliently deformable leaves are biased towards their resting position and in being so biased, they exert a biasing force on the sidewalls of the holder thereby retaining the pooper scooper device in the holder.

Figure 13A:
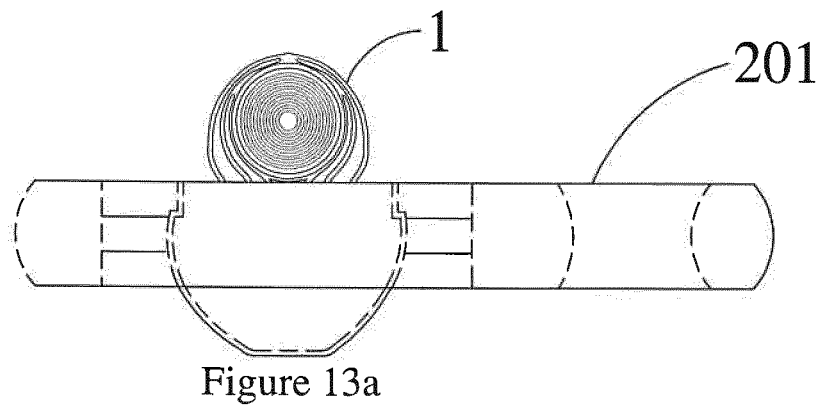
FIG. 13a-b show plan views of the dog leash assembly, with an alternative configuration for the holder.
Figure 13B:
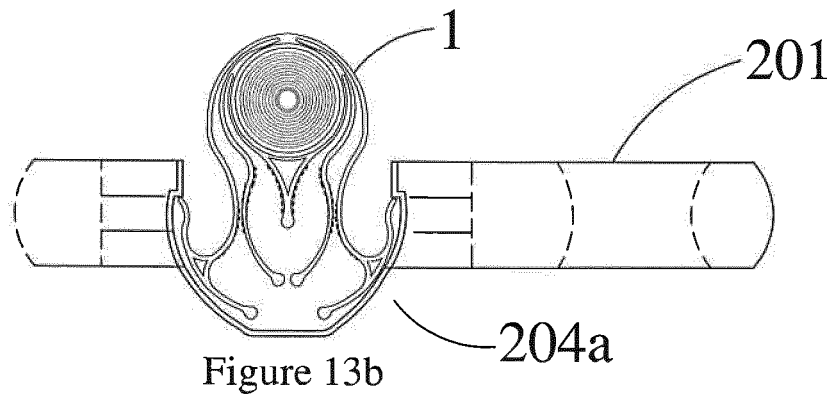
Figure 14:
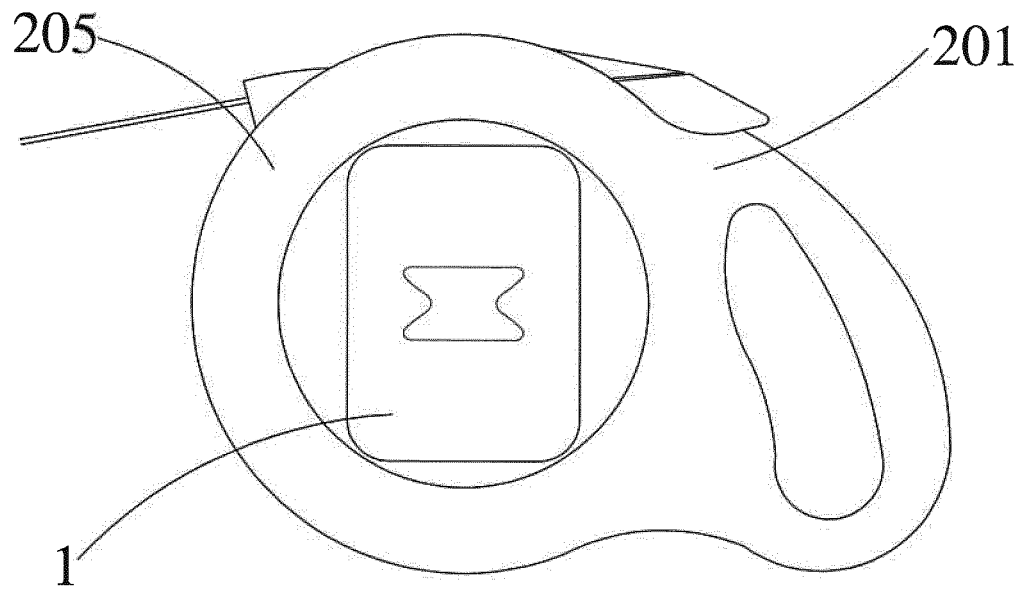
FIG. 14 shows a side view of the dog leash assembly, with an alternative configuration for the holder.

FIG. 12 shows the pooper scooper device retained in the holder of the dog leash assembly. The skilled person will appreciate that alternative holder configurations would be equally suitable. For example, FIGS. 13a, 13b and 14 show the dog leash assembly according to the invention, having alternative configurations for the holder (104a). FIGS. 13a and 13b show a plan view of an alternative embodiment of the dog leash assembly (201). FIG. 14 shows a side view of the dog leash assembly 201. In the embodiment shown in FIGS. 13a, 13b and 14, the holder (204a) is centrally located within the body (205) of the assembly, and within the body, the spool (not shown) is configured about the holder (204a).

Figure 15:
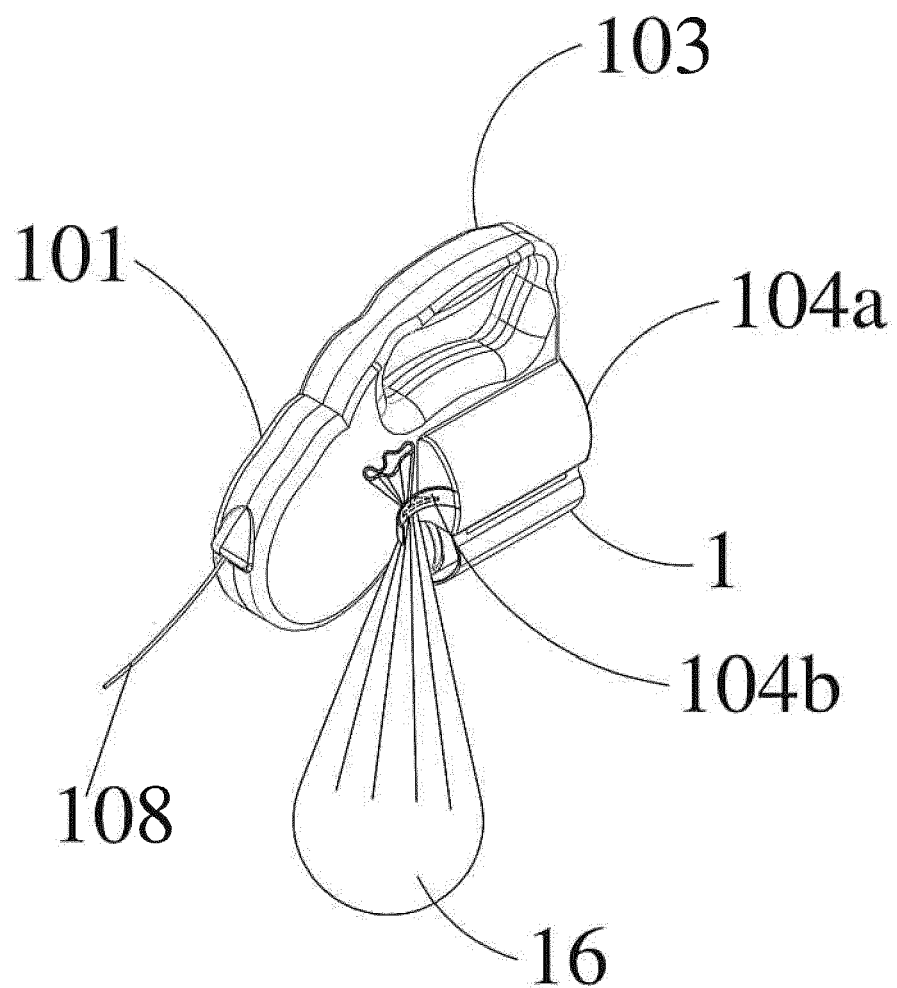
FIG. 15 shows the dog leash assembly, with a collection bag comprising faeces held in the bag holder.

FIG. 15 shows the dog leash assembly (101) with a tied off bag (16) comprising faeces attached to the bag holder (104b).

Figure 16:
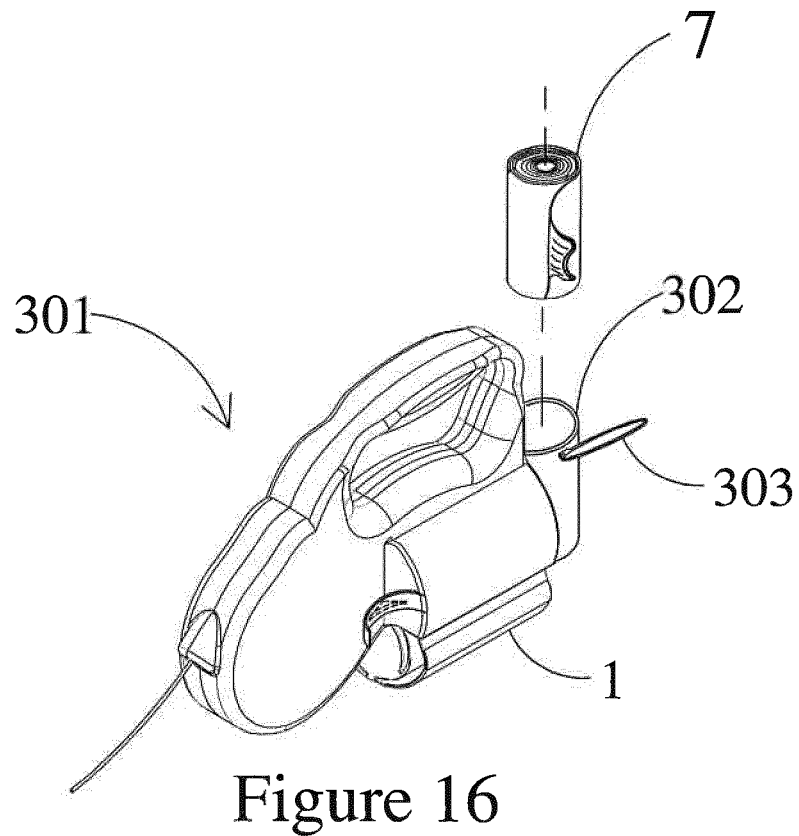
FIGS. 16-18 show alternative dog leash assemblies according to the invention.
Figure 17:
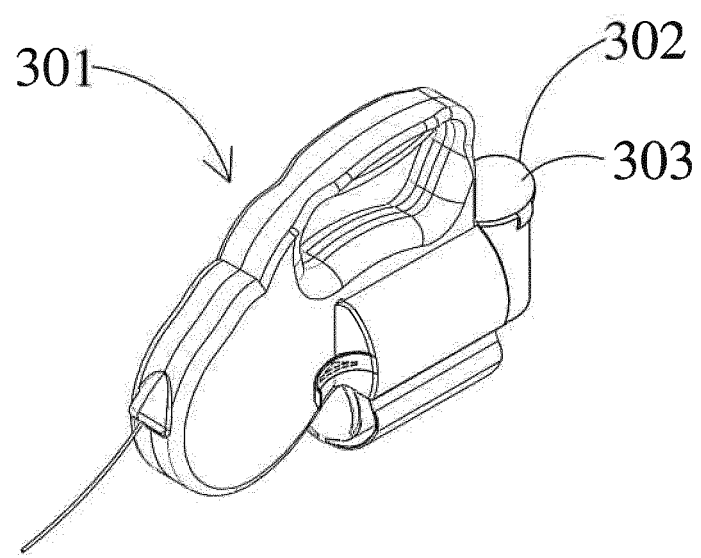
Figure 18:
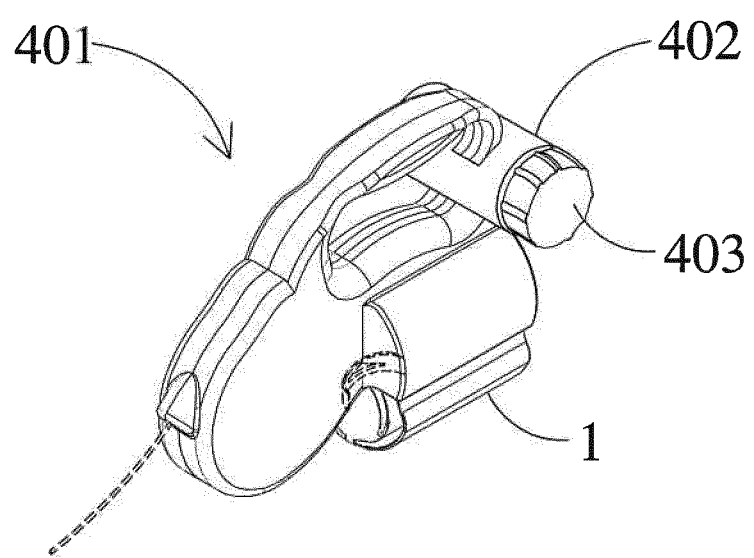

FIG. 16 shows an alternative dog leash assembly (301) according to the invention, with the pooper scooper device (1) retained therein. The dog leash (301) in FIG. 16 comprises all of the features of the dog leash assembly of FIGS. 7 to 15, but further comprises a receptacle (302) for storing collection bags (7). Suitably, the receptacle (302) comprises a tubular body, in which a spare roll of collection bags (7) can be stored. Optionally the tubular body may have a cap or lid, such as a screw cap or a snap on lid (303) which can be opened or removed in order to gain access to the collection bags stored within the tubular body of the receptacle. The skilled artisan will appreciate, that alternative configurations for the receptacle to that shown in FIG. 16 would also be suitable. FIG. 17 shows the device of FIG. 16 with the lid (303) of said receptacle in a closed position. FIG. 18 shows yet a further dog leash assembly (401) comprising a receptacle (402) suitable for storing a roll of collection bags. The receptacle comprises a screw cap lid (403).

Advantageously, the dog leash assembly according to the invention reduces the number of items that a dog walker needs to carry, to a single item when bringing a dog for a walk. This represents a significant advantage over cumbersome prior art pooper scooper devices, particularly over the bulkier models discussed previously. Furthermore, the dog leash assemblies comprising receptacles for storing collection bags, reduces the likelihood of the operator running out of bags. Optionally, the dog leash assembly may further comprise a torch.

Figure 19:
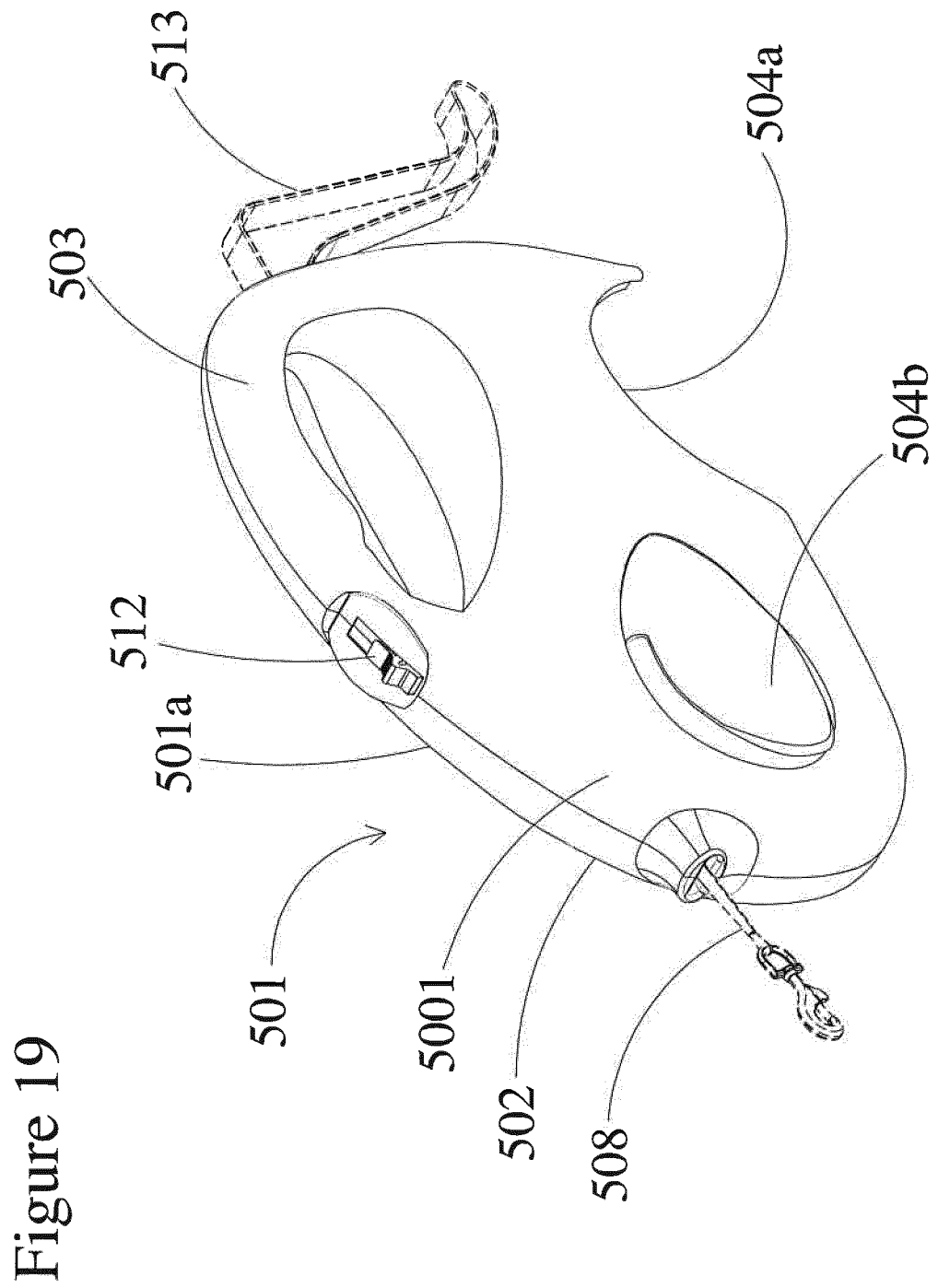
FIG. 19 shows a dog leash assembly according to a further aspect of the invention.
Figure 20:
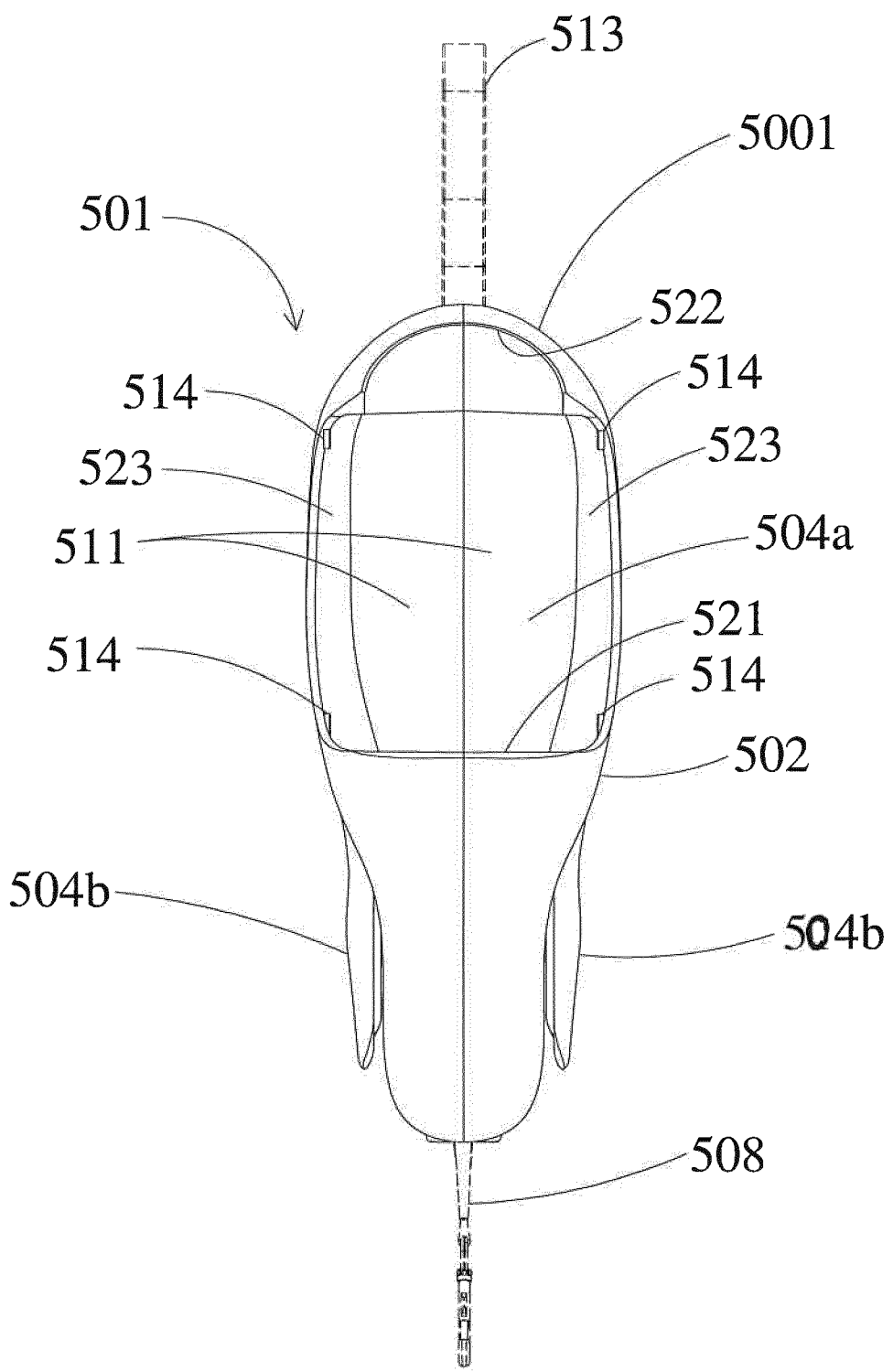
FIG. 20 is a bottom view of the dog leash assembly of FIG. 19.

FIG. 19 shows another embodiment of a dog leash assembly (501) according to the invention. The dog leash assembly (501) comprises a dog leash housing (5001) comprising a body (501a), having a handle (503), and engaging means (not shown) for securing a dog leash (508) to said housing. The dog leash assembly comprises a retractable dog leash (502). The engaging means comprises a spool rotatably mounted within the body (not shown), said spool being connected to one end of said leash (508). The body (501a) further comprises a holder (504a) for holding a pooper scooper device. The dog leash assembly (501) also may optionally comprise a strap (513) through which the operator may insert their hand, and which can also be used to hang the dog leash housing (5001), for example from a hook, when storing the dog leash assembly. FIG. 20 shows a bottom view of the dog leash assembly of FIG. 19. The holder (504a) comprises a chamber (511) within the body of the dog leash housing (5001). The chamber comprises a first end (521), a second end (522) and sidewalls (523) joining said first and second ends. The holder (504a) further comprises retaining means for retaining a pooper scooper device at least partially within the chamber (511). The holder (504a) is configured to retain the pooper scooper, such that the handle of the pooper scooper (i.e. the part of the pooper scooper which is held by the operator during use) is readily accessible, and the faeces engaging element(s) of the pooper scooper are housed within the chamber. The handle of the pooper scooper may be readily accessible by being at least partially outside the chamber (511). For example the handle may be entirely outside the chamber (511).

In the embodiment shown in FIG. 20, the retaining means comprises abutments (514) which frictionally engage with a pooper scooper device to retain said pooper scooper device at least partially within the chamber (511). Suitably, the chamber is not a closed cavity, within which the pooper scooper device is retained, which requires opening to gain access to a pooper scooper device retained within the chamber. Advantageously, a pooper scooper device may be retained within the chamber (511) such that the portion of the pooper scooper device which the operator holds during use, i.e. the handle of the pooper scooper device, is accessible outside the chamber, thereby providing the operator with easy access to the pooper scooper, without the need to open the chamber for example.

In the embodiment shown in FIG. 20, the holder (504a) is partially cylindrical, however, the skilled person will appreciate that alternative configurations would be equally suitable. Advantageously, the holder is configured such that the faeces engaging part of a pooper scooper device fits snugly into the holder (504a), and the handle of the pooper scooper device remains accessible outside the chamber (511) when a pooper scooper device is retained therein.

Figure 21:
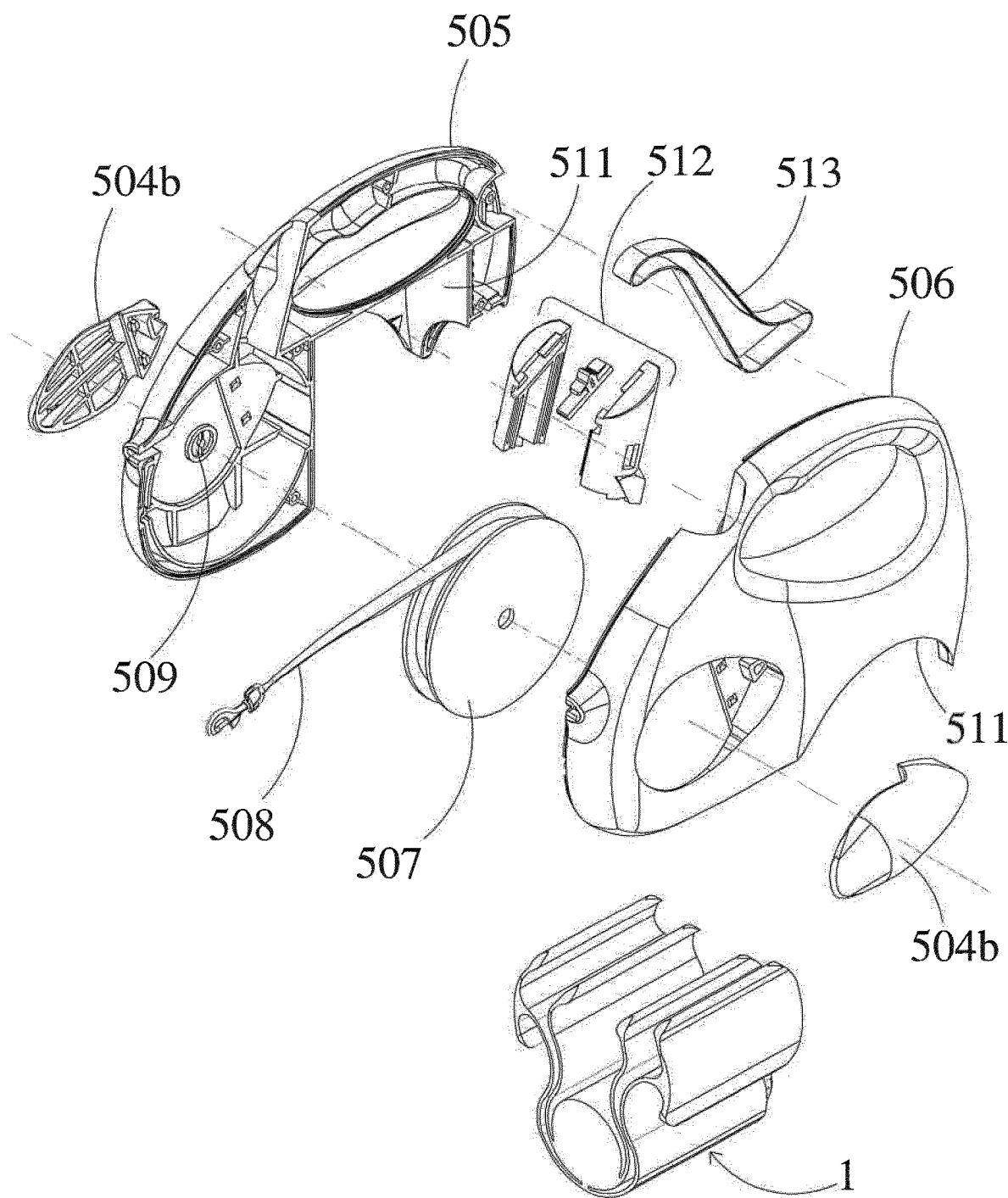
FIG. 21 is a disassembled view of the dog leash assembly of FIG. 19 with the pooper scooper device of FIG. 1b also shown.

FIG. 21 shows the dog leash assembly (501) according to the invention in a disassembled state. The dog leash assembly (501) is a retractable dog leash (502) assembly. The dog leash assembly (501) comprises a dog leash housing comprising a body having a first part (505) and a second part (506). The dog leash housing comprises engaging means for securing a dog leash to said housing. The dog leash assembly comprises a spool (507) with a leash (508) wound thereon which is rotatably mounted within the body of the dog leash housing. Each of the first and second parts may be formed for example by moulding, such as injection moulding. The spool (507) comprises a retraction mechanism (not shown) such as an internal spring which can be tensioned on the spool holder (509). The first part (505) and second part (506) can be assembled together with the spool (507) housed therein on the spool holder (509) and said first and second parts can be fixed together using fixing means, for example screws may be used. In the embodiment shown, each of the first part (505) and second part (506) comprise a chamber (511). When the first and second parts are assembled to form the dog leash assembly, the chamber (511) of the first part and that of the second part form a holder (504a) in which a pooper scooper device may be retained, for example by retaining means (not shown). Clips (504b) are biased against the body (501a) and function as bag holders. The pooper scooper (1) shown in FIG. 21 is a perspective view of the pooper scooper of FIG. 1c. The retractable dog leash (502) further comprises a locking mechanism (512), which enables the user to control the length of the leash (508) which is unwound from the spool (507) and thereby control the distance between a tethered animal and the operator holding the dog leash assembly.

Figure 22:
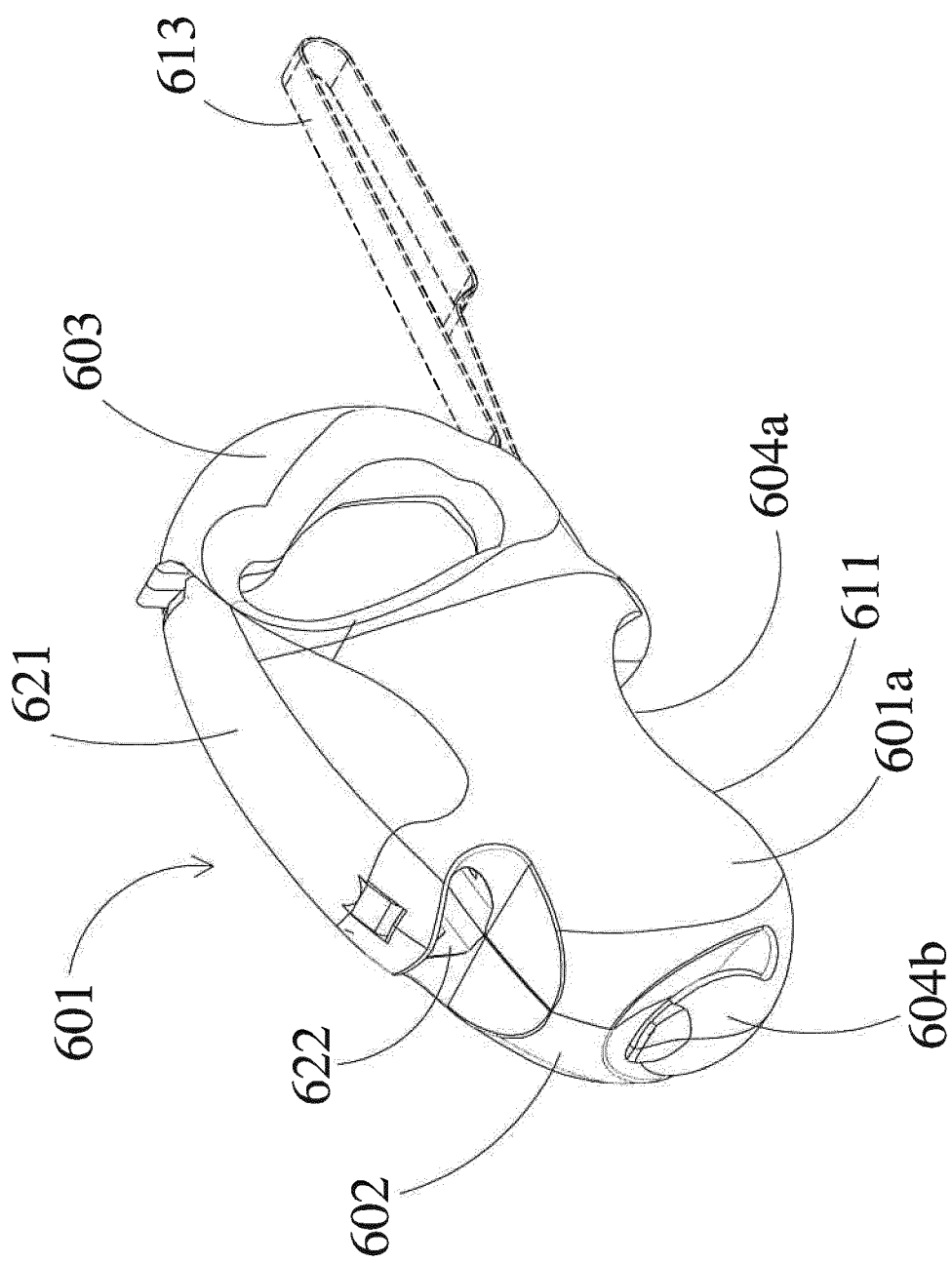
FIG. 22 is a perspective view of a dog leash housing according to the invention.

FIG. 22 shows a dog leash housing (601) according to a further aspect of the invention. The dog leash housing (601) is configured to secure a dog leash. In the embodiment shown in FIG. 22, the dog leash housing comprises a body (601a), having a handle (603) and engaging means (not shown) for securing a dog leash, such as a rope lead, to said housing (601). The dog leash housing (601) comprises a cover member (621) which may optionally be hingedly engaged with the body (601a) (as shown in FIG. 22). The cover member provides access to the engaging means. The cover member is shown in the closed or locked position in FIG. 22. Locking means may lock the cover member in the closed or locked position. The dog leash housing of FIG. 22 comprises an aperture (622) through which a dog leash may be disposed when secured by engaging means to the housing. For example, a dog leash such as a rope lead may be guided through the aperture (622) and secured by the engaging means to the housing. For example the engaging means may secure a dog leash within the body of the housing.

The dog leash housing (601) may optionally comprise a strap (613). The dog leash housing (601) may optionally comprise a torch.

The body (601a) of the housing (601) further comprises a holder (604a) for holding a pooper scooper device. The dog leash housing (601) also comprises a clip (604b) which is biased against the body (601a) and functions as a bag holder. The holder (604a) comprises a chamber (611) within the body of the dog leash housing. The holder (604a) further comprises retaining means (not shown) for retaining a pooper scooper device at least partially within the chamber (611).

Suitably, the chamber (611) is not a closed cavity, within which a pooper scooper device is retained, which requires opening to gain access to a pooper scooper device retained within the chamber. Advantageously, a pooper scooper device may be retained within the chamber (611) such that the portion of the pooper scooper device which the operator holds during use i.e. the handle of the pooper scooper, is at least partially outside the chamber, thereby providing the operator with easy access to the pooper scooper, without the need to open the chamber for example.

Together the dog leash housing according to one aspect of the present invention and a dog leash secured thereto, form a dog leash assembly according to a further aspect of the invention, such as a non-retractable dog leash assembly.

Figure 23:
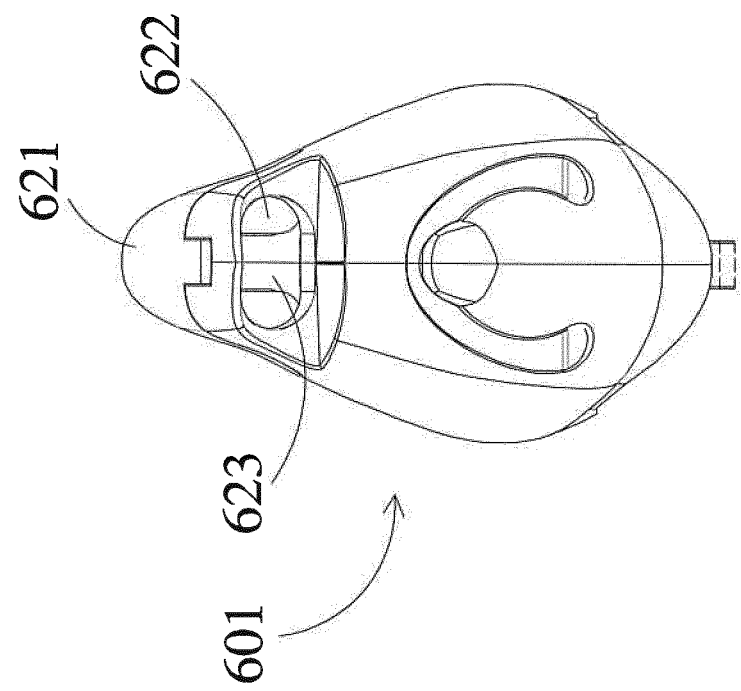
FIG. 23 is a front end view of the dog leash housing shown in FIG. 22.

FIG. 23 shows a front end view of the dog leash housing of FIG. 22. The engaging means (623) is housed beneath the cover (621), and can be seen through the aperture (622).

Figure 24:
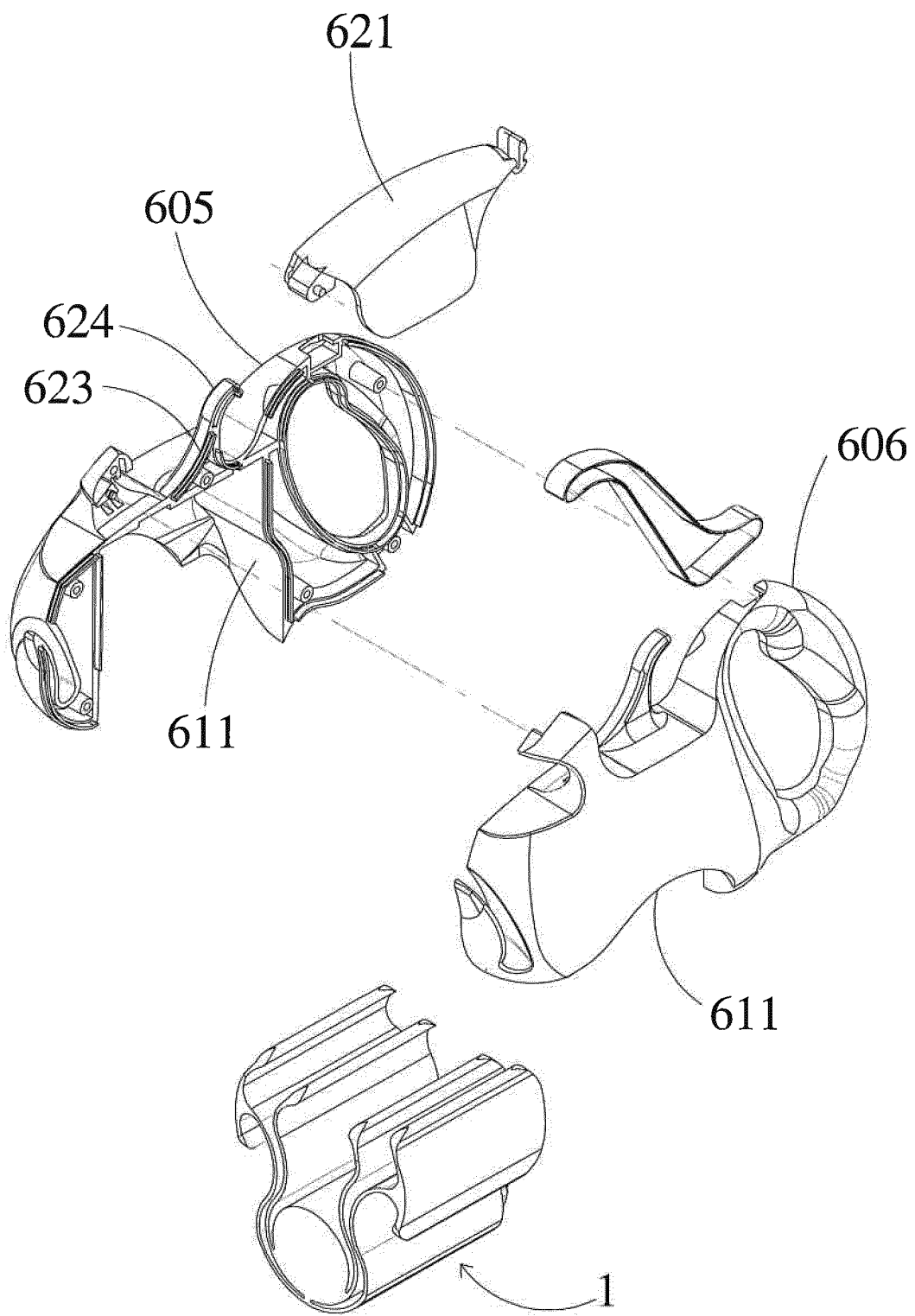
FIG. 24 is a disassembled view of the dog leash housing shown in FIGS. 22 and 23.

FIG. 24 shows the dog leash housing of FIG. 22 in a disassembled state. The dog leash housing (601) comprises a first part (605) and a second part (606). Each of the first and second parts may be formed for example by moulding, such as injection moulding. The first and second parts can be fixed together using fixing means, for example screws may be used. In the embodiment shown, each of the first part (605) and second part (606) comprise a chamber (611). When the first and second parts are assembled to form the dog leash housing, the chamber of the first part and that of the second part form a holder (504a) in which a pooper scooper device (1) can be retained, for example by retaining means (not shown). The pooper scooper (1) shown in FIG. 21 is a perspective view of the pooper scooper of FIG. 1c.

In the embodiment shown in FIG. 24, a hook (624) forms the engaging means (623) for securing a dog leash to the dog leash housing (601).

The cover member (621) may be connected to the body (601a) via a hinge. The cover member (621) provides access to the engaging means (623). An end loop of a dog leash may be guided through the aperture (622) and secured by the hook (624). The cover member (621) prevents unwanted release of the dog leash from the engaging means (623).

Advantageously, the chamber (611) is dimensioned such that its length is greater than its width, and a longitudinal axis of the chamber is substantially parallel to the longitudinal axis of the dog leash housing. Thus when the pooper scooper device is retained at least partially within the chamber, the faeces engaging elements of the pooper scooper device, which correspond to a terminal region of leaves (i.e. the opposing leaves and the intermediate leaves) of the pooper scooper device, which grip the faeces (through a bag) are housed within the chamber, and the handle of the pooper scooper device, i.e. a portion of the device which is held by the operator of the device during use, remains accessible outside the chamber of the dog leash housing. This configuration ensures that the pooper scooper device is readily accessible to the operator, and should the pooper scooper device be inadvertently contaminated during use, the leaves of the device are not exposed and therefore are less likely to be a further source of contamination. This configuration also affords balance to the dog leash housing, thereby ensuring the user can comfortably carry and use the dog leash housing, and a dog leash assembly comprising a dog leash housing according to the invention.

Figure 25:
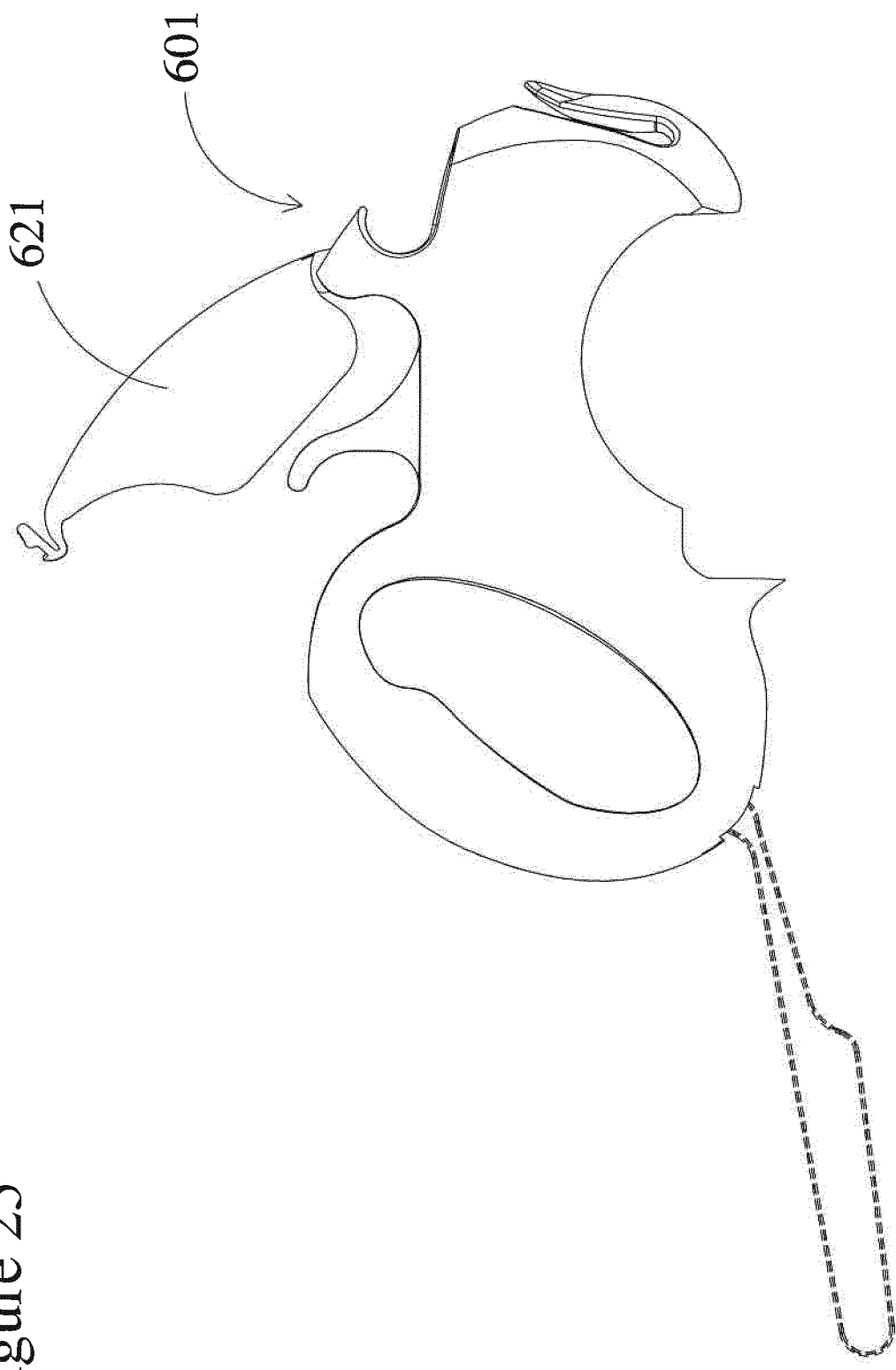
FIG. 25 is a side view of the dog leash housing shown in FIGS. 22 to 24.

FIG. 25 shows a side view of a dog leash housing (601), wherein the cover member (621) is in an open position.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A pooper scooper device comprising:
   a base part;
   two opposing leaves on the base part;
   at least one intermediate leaf disposed between the opposing leaves, and
   a pair of actuating members coupled to said opposing leaves for reversibly displacing said opposing leaves from a first position to a second position,
   wherein the two opposing leaves and the at least one intermediate leaf are formed in a spaced apart manner, said at least one intermediate leaf extending downwardly from the base part, and
   wherein the at least one intermediate leaf or leaves define channels between the opposing leaves, such that a bag may be interposed between the opposing leaves in the channels, so that when the device is pressed down onto faeces a part of said bag and the faeces are forced into and lodge in said channels between the opposing leaves and the at least one intermediate leaf.

2. The pooper scooper device according to claim 1, wherein the base part and all leaves are integrally formed.

3. The pooper scooper device according to claim 1, wherein at least the two opposing leaves are moveable relative to each other to move apart in an opening direction and move towards each other in a closing direction.

4. The pooper scooper device according to claim 1, further comprising gripping means positioned within the channels.

5. The pooper scooper device according to claim 1, wherein the actuating members comprise digit receptacles defined in each of the opposing leaves.

6. The pooper scooper device according to claim 5, wherein each of the actuating members comprise a gripping channel comprising a base and sidewalls, said gripping channel being defined by an opposing leaf and a baffle, and
   wherein said gripping channel is configured to receive an operator's digit, and
   wherein the gripping channel is a substantially U-shaped channel, or a substantially C-shaped channel.

7. The pooper scooper device according to claim 1, comprising at least two intermediate leaves disposed between the opposing leaves.

8. The pooper scooper device according to claim 1, wherein the opposing leaves and the base part flex on a flexure bearing principle.

9. The pooper scooper device according to claim 1, wherein the base part comprises a housing for storing a plurality of disposable bags.

10. The pooper scooper device according to claim 9, wherein the base part comprises a dispensing aid for dispensing or receiving bags from said housing.

11. The pooper scooper device according to claim 10, wherein the dispensing aid comprises a rotatable dispenser for dispensing bags from a roll.

12. The pooper scooper device according to claim 1, wherein the base is substantially cylindrical, and the leaves are circumferentially displaced about the base.

13. The pooper scooper device according to claim 1, wherein the opposing leaves are arcuately shaped.

14. The pooper scooper device according to claim 1, wherein each of the leaves comprises terminal regions and said terminal regions have an enlarged rounded edge such that the cross section of said terminal regions may be substantially mushroom shaped or tear drop shaped.

15. The pooper scooper device according to claim 1, further comprising a holder for receiving said device.

16. A dog leash housing comprising:
   a body;
   a handle; and
   engaging means for securing a dog leash to said housing, said body comprising a holder for a pooper scooper device,
   said holder comprising:
      a chamber and retaining means for retaining a pooper scooper device at least partially within the chamber such that faeces engaging elements of the pooper scooper device are housed within the chamber and a handle of the pooper scooper device remains at least partially outside the chamber; and
   said pooper scooper device comprising:
      a base part,
      two opposing leaves on the base part,
      at least one intermediate leaf disposed between the opposing leaves,
         wherein the two opposing leaves and the at least one intermediate leaf are formed in a spaced apart manner, said at least one intermediate leaf extending downwardly from the base part, and
         wherein the at least one intermediate leaf or leaves define channels between the opposing leaves, such that a bag may be interposed between the opposing leaves in the channels, so that when the device is pressed down onto faeces a part of said bag and the faeces are forced into and lodge in said channels between the opposing leaves and the at least one intermediate leaf.

17. A dog leash assembly comprising:
   a dog leash housing comprising:
      a body,
      a handle,
      engaging means for securing a dog leash to said housing, said body comprising a holder for a pooper scooper device,
         said holder comprising:
            a chamber and retaining means for retaining a pooper scooper device at least partially within the chamber such that faeces engaging elements of the pooper scooper device are housed within the chamber and a handle of the pooper scooper device remains at least partially outside the chamber; and
         said pooper scooper device comprising:
            a base part,
            two opposing leaves on the base part,
            at least one intermediate leaf disposed between the opposing leaves,
               wherein the two opposing leaves and the at least one intermediate leaf are formed in a spaced apart manner, said at least one intermediate leaf extending downwardly from the base part, and
               wherein the at least one intermediate leaf or leaves define channels between the opposing leaves, such that a bag may be interposed between the opposing leaves in the channels, so that when the device is pressed down onto faeces a part of said bag and the faeces are forced into and lodge in said channels between the opposing leaves and the at least one intermediate leaf; and
   a dog leash secured thereto.

18. The dog leash assembly according to claim 17, wherein the dog leash is a rope lead.

19. The dog leash assembly according to claim 18, wherein the dog leash assembly comprises a retractable dog leash.

20. A method for bagging faeces comprising:
providing a pooper scooper device comprising:
- a base part,
- two opposing leaves on the base part,
- at least one intermediate leaf disposed between the opposing leaves, and
- a pair of actuating members coupled to said opposing leaves for reversibly displacing said opposing leaves from a first position to a second position,
  - wherein, the two opposing leaves and the at least one intermediate leaf are formed in a spaced apart manner, said at least one intermediate leaf extending downwardly from the base part, and
  - wherein the at least one intermediate leaf or leaves define channels between the opposing leaves, such that a bag may be interposed between the opposing leaves in the channels, so that when the device is pressed down onto faeces a part of said bag and the faeces are forced into and lodge in said channels between the opposing leaves and the at least one intermediate leaf interposing the bag between the leaves of the pooper scooper device;

employing said pooper scooper device to press said bag into said faeces, such that the faeces is forced into the channels of the device and thereby grips said faeces, whereby the device is protected from directly contacting the faeces by the bag; and enclosing the faeces in the bag.

* * * * *